US012236900B2

(12) United States Patent
Hong

(10) Patent No.: US 12,236,900 B2
(45) Date of Patent: Feb. 25, 2025

(54) DISPLAY DEVICE AND DATA DRIVING CIRCUIT

(71) Applicant: LG Display Co., Ltd., Seoul (KR)

(72) Inventor: MooKyoung Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/858,835

(22) Filed: Jul. 6, 2022

(65) Prior Publication Data

US 2023/0032028 A1 Feb. 2, 2023

(30) Foreign Application Priority Data

Jul. 30, 2021 (KR) ........................ 10-2021-0100665

(51) Int. Cl.
*G09G 3/3291* (2016.01)

(52) U.S. Cl.
CPC ... *G09G 3/3291* (2013.01); *G09G 2300/0426* (2013.01); *G09G 2300/0842* (2013.01);
(Continued)

(58) Field of Classification Search
CPC .. G09G 3/3233; G09G 3/3258; G09G 3/3275; G09G 3/3291; G09G 3/20; G09G 3/006; G09G 2300/0819; G09G 2300/043; G09G 2300/0426; G09G 2320/0295; G09G 2320/0233; G09G 2320/043; G09G 2320/0693; G09G 2320/0242; G09G 2320/045; G09G 2320/0223; G09G 2310/0251; G09G 2310/027; G09G 2310/0275; G09G 2330/028
See application file for complete search history.

(56) References Cited

U.S. PATENT DOCUMENTS 9,076,387 B1 * 7/2015 Lee .......................... G09G 3/20
2013/0278489 A1 * 10/2013 Tachibana ............ G09G 3/3611
345/98

(Continued)

FOREIGN PATENT DOCUMENTS

CN 108206007 A 6/2018
KR 10-2018-0071469 A 6/2018
KR 10-2019-0057705 A 5/2019

OTHER PUBLICATIONS

Sneha H.L., “Analyzing Circuits via Source Transformation”,Nov. 1, 2016, All About Circuits, https://www.allaboutcircuits.com/technical-articles/source-transformation/ (Year: 2016).*

*Primary Examiner* — Dong Hui Liang
(74) *Attorney, Agent, or Firm* — Birch, Stewart, Kolasch & Birch, LLP

(57) ABSTRACT

A display device can include a data driving circuit including k sensing terminals and a switching part including a switching element positioned between an outermost sensing terminal among the k sensing terminals and a constant voltage supply terminal, wherein k is a positive integer greater than or equal to 2; and a display panel including a plurality of subpixels and a plurality of sensing lines electrically connected with the plurality of subpixels, wherein the plurality of sensing lines are electrically connected with n sensing terminals among the k sensing terminals disposed in the data driving circuit, where n is a positive integer less than or equal to k and n is greater than or equal to 1.

19 Claims, 22 Drawing Sheets

(52) U.S. Cl.
CPC . *G09G 2310/08* (2013.01); *G09G 2320/0223* (2013.01); *G09G 2330/028* (2013.01)

(56) References Cited

U.S. PATENT DOCUMENTS

| | | | | |
|---|---|---|---|---|
| 2014/0139510 | A1* | 5/2014 | Han | G09G 3/3233 345/82 |
| 2017/0004776 | A1* | 1/2017 | Park | G09G 3/3233 |
| 2018/0061913 | A1* | 3/2018 | Kim | G09G 3/3233 |
| 2018/0174522 | A1* | 6/2018 | Lee | G09G 3/3258 |
| 2019/0066578 | A1* | 2/2019 | Chen | G09G 3/3233 |
| 2019/0088180 | A1* | 3/2019 | Cai | H01L 27/124 |
| 2020/0074938 | A1* | 3/2020 | Kim | G09G 3/3233 |
| 2021/0035501 | A1* | 2/2021 | Feng | G09G 3/3283 |

* cited by examiner

| | | A | B |
|---|---|---|---|
| input/output unit(460) | CH_IN | SL not connected | SL connected |
| | CH_OUT | DL not connected | DL connected |
| 715 | | ON | OFF |
| 720 | | Vsen_RTA | Vsen_SP |

| | | C | D |
|---|---|---|---|
| input/output unit(460) | CH_IN | SL not connected | SL connected |
| | CH_OUT | DL not connected | DL connected |
| 715 | | ON | OFF |
| 720 | | Vsen_RTA | Vsen_SP |

| | Stored Value |
|---|---|
| Size A | 00 |
| Size B | 01 |
| Size C | 10 |
| Size D | 11 |

| | X, X' | Y, Y' | Z, Z' |
|---|---|---|---|
| CH_IN | SL connected in size A | SL connected in size A, B | SL connected in size A, B, C |
| SWCS | Size A : 715 OFF<br>Size B, C, D : 715 ON | Size A, B : 715 OFF<br>Size C, D : 715 ON | Size A, B, C : 715 OFF<br>Size D : 715 ON |
| 720 | Size A : Vsen_SP<br>Size B, C, D : Vsen_RTA | Size A, B : Vsen_SP<br>Size C, D : Vsen_RTA | Size A, B, C : Vsen_SP<br>Size D : Vsen_RTA |
| 1315 | Size A, B, C, D : Vsen_RTA | | |
| SW_Free | Size A, B, C, D : Vsen_SP | | |

DISPLAY DEVICE AND DATA DRIVING CIRCUIT

CROSS-REFERENCE TO RELATED APPLICATION

This application claims priority to Korean Patent Application No. 10-2021-0100665, filed in the Republic of Korea on Jul. 30, 2021, the entirety of which is hereby incorporated by reference for all purposes as if fully set forth herein.

BACKGROUND OF THE DISCLOSURE

Field

Embodiments of the disclosure relate to a display device and a data driving circuit.

Description of Related Art

As the information society further develops, various demands for display devices for displaying images are increasing, and various types of display devices, such as liquid crystal displays (LCDs) and organic light emitting diode (OLED) displays, are used.

Such display devices may include different types of display panels with various specifications.

Data driving circuits may be designed and manufactured according to the display panels with various specifications. Accordingly, a need arises for a data driving circuit that may be commonly used in different types of display panels with various specifications.

SUMMARY OF THE DISCLOSURE

Embodiments of the disclosure may provide a data driving circuit that may be commonly applied to different types of display panels with various specifications and a display device including the same.

Embodiments of the disclosure may provide a display device and a data driving circuit capable of compensating for a change in a characteristic value of an analog-to-digital converter in real time.

According to embodiments of the disclosure, there may be provided a display device comprising a data driving circuit including k (k≥2) sensing terminals and a switching part including a switching element positioned between an outermost sensing terminal among the k sensing terminals and a constant voltage supply terminal and a display panel having, thereon, a plurality of subpixels and a plurality of sensing lines electrically connected with the plurality of subpixels, in which the plurality of sensing lines are electrically connected with n (1≤n≤k) sensing terminals among the k sensing terminals disposed in the data driving circuit, where k is a positive integer.

According to embodiments of the disclosure, there may be provided a data driving circuit comprising k (k≥2) sensing terminals, a constant voltage supply terminal supplying a constant voltage to a constant voltage supply line, a sensing part receiving an analog voltage from each of the k sensing terminals, and a switching part including a switching element positioned between an outermost sensing terminal among the k sensing terminals and the constant voltage supply line.

Effects of the Invention

According to embodiments of the disclosure, there may be provided a data driving circuit that may be commonly applied to different type of display panels with various specifications and a display device including the same.

According to embodiments of the disclosure, there may be provided a display device and a data driving circuit capable of compensating for a change in a characteristic value of an analog-to-digital converter in real time.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
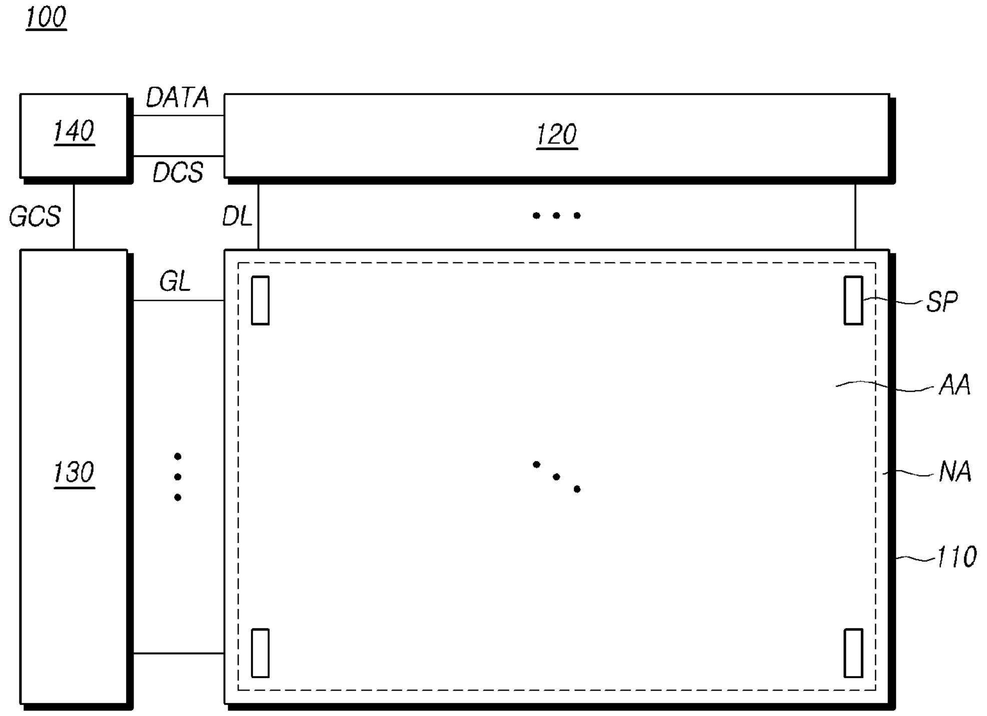
FIG. 1 is a view illustrating a display device according to an embodiment of the disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "can."

Hereinafter, various embodiments of the disclosure are described in detail with reference to the accompanying drawings.

FIG. 1 is a view illustrating a display device 100 according to an embodiment of the disclosure.

Referring to FIG. 1, the display device 100 according to an embodiment of the disclosure can include a display panel 110, a data driving unit 120 and a gate driving unit 130 for driving the display panel 110, and a controller 140 for controlling the data driving unit 120 and the gate driving unit 130.

In the display panel 110, signal lines, such as a plurality of data lines DL and a plurality of gate lines GL, can be disposed on a substrate. In the display panel 110, a plurality of subpixels SP connected with the plurality of data lines DL and the gate lines GL can be disposed.

The display panel 110 can include a display area AA in which images are displayed and a non-display area NA in which no image is displayed. In the display panel 110, a plurality of subpixels SP for displaying an image can be disposed in the display area AA and, in the non-display area NA, the data driving unit 120 and the gate driving unit 130 can be mounted, or pad units connected with the data driving unit 120 or the gate driving unit 130 can be disposed.

The data driving unit 120 is a circuit for driving the plurality of data lines DL, and can supply data voltages to the plurality of data lines DL. The gate driving unit 130 is a circuit for driving the plurality of gate lines GL, and can supply gate signals to the plurality of gate lines GL. The controller 140 can supply a data driving timing control signal DCS to the data driving unit 120 to control the operation timing of the data driving unit 120. The controller 140 can supply a gate driving timing control signal GCS for controlling the operation timing of the gate driving unit 130 to the gate driving unit 130.

The controller 140 can start scanning according to a timing implemented in each frame, convert input image data input from the outside into image data DATA suited for the data signal format used in the data driving unit 120, supply the image data DATA to the data driving unit 120, and control data driving at an appropriate time suited for scanning.

The controller 140 receives, from the outside (e.g., a host system), various timing signals including a vertical synchronization signal Vsync, a horizontal synchronization signal Hsync, an input data enable signal DE, and a clock signal, along with the input image data.

To control the data driving unit 120 and the gate driving unit 130, the controller 140 receives timing signals, such as the vertical synchronization signal Vsync, horizontal synchronization signal Hsync, input data enable signal DE, and clock signal CLK, generates various control signals DCS and GCS, and outputs the control signals to the data driving unit 120 and the gate driving unit 130.

To control the gate driving unit 130, the controller 140 outputs various gate driving timing control signals GCS including a gate start pulse GSP, a gate shift clock GSC, and a gate output enable signal GOE.

To control the data driving unit 140, the controller 140 outputs various data driving timing control signals DCS including, e.g., a source start pulse SSP and a source sampling clock.

The data driving unit 120 receives the image data DATA from the controller 140 and drives the plurality of data lines DL.

The data driving unit 120 can include one or more source driving integrated circuit (SDICs).

Each source driving integrated circuit (SDIC) can be connected with the display panel 110 by a tape automated bonding (TAB) method or connected to a bonding pad of the display panel 110 by a chip on glass (COG) method or can be implemented by a chip on film (COF) method and connected with the display panel 110.

The gate driving unit 130 can output a gate signal of a turn-on level voltage or a gate signal of a turn-off level voltage according to the control of the controller 140. The gate driving unit 130 can drive the plurality of gate lines GL by supplying gate signals of the turn-on level voltage to the plurality of gate lines GL.

The gate driving unit 130 can be connected with the display panel 110 by a tape automated bonding (TAB) method or connected to a bonding pad of the self-emission display panel 110 by a COG or chip on panel (COP) method or can be connected with the display panel 110 according to a COF method.

The gate driving unit 130 can be formed in a gate in panel (GIP) type, in the non-display area NA of the display panel 110. The gate driving unit 110 can be disposed on the substrate of the display panel 110 or can be connected to the substrate of the display panel 110. The gate driving unit 130 that is of a GIP type can be disposed in the non-display area NA of the substrate. The gate driving unit 130 that is of a chip-on-glass (COG) type or chip-on-film (COF) type can be connected to the substrate of the display panel 110.

When a specific gate line GL is opened by the gate driving circuit 130, the data driving unit 120 can convert the image data DATA received from the controller 140 into an analog data voltage and supply it to the plurality of data lines DL.

The data driving unit 120 can be connected with one side (e.g., an upper or lower side) of the display panel 110. Depending on the driving scheme or the panel design scheme, the data driving unit 120 can be connected with both sides (e.g., upper and lower sides) of the self-emission display panel 110, or two or more of the four sides of the self-emission display panel 110.

The gate driving unit 130 can be connected with one side (e.g., a left or right side) of the display panel 110. Depending on the driving scheme or the panel design scheme, the gate driving unit 130 can be connected with both sides (e.g., left and right sides) of the display panel 110, or two or more of the four sides of the display panel 110.

The controller 140 can be a timing controller used in display technology, a control device that can perform other control functions as well as the functions of the timing controller, or a control device other than the timing controller, or can be a circuit in the control device. The controller 140 can be implemented as various circuits or electronic components, such as an integrated circuit (IC), a field programmable gate array (FPGA), an application specific integrated circuit (ASIC), or a processor.

The controller 140 can be mounted on a printed circuit board or a flexible printed circuit and can be electrically connected with the data driving unit 120 and the gate driving unit 130 through the printed circuit board or the flexible printed circuit.

The controller 140 can transmit/receive signals to/from the data driving circuit 120 according to one or more predetermined interfaces. The interface can include, e.g., a low voltage differential signaling (LVDS) interface, an EPI interface, and a serial peripheral interface (SPI).

The controller 140 can include a storage medium, such as one or more registers.

The display device 100 according to embodiments of the disclosure can be a display including a backlight unit, such as a liquid crystal display, or can be a self-emission display, such as an organic light emitting diode (OLED) display, a quantum dot display, or a micro light emitting diode (LED) display.

According to an embodiment, when the display device 100 is an OLED display, each subpixel SP can include an organic light emitting diode (OLED), which is self-luminous, as a light emitting element. According to an embodiment, when the display device 100 is a quantum dot display, each subpixel SP can include a light emitting element formed of a quantum dot, which is a self-luminous semiconductor crystal. According to an embodiment, when the display device 100 is a micro LED display, each subpixel SP can include a micro light emitting diode), which is self-luminous and formed of an inorganic material, as a light emitting element.

Figure 2:
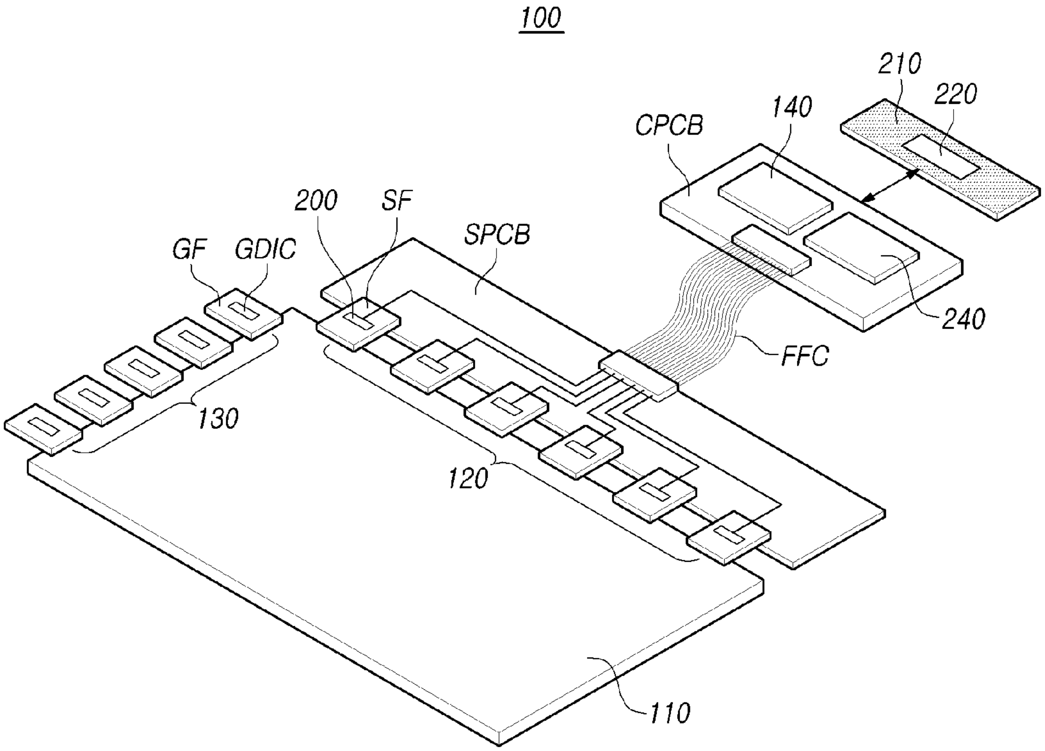
FIG. 2 is a view schematically illustrating a display device according to an embodiment of the disclosure.

FIG. 2 is a view schematically illustrating a display device 100 according to an embodiment of the disclosure.

FIG. 2 illustrates an example in which the data driving unit 120 in the display device 100 according to an embodiment of the disclosure is implemented in the chip on film (COF) scheme among various schemes (e.g., TAB, COG, or COF).

The data driving unit 120 can include one or more data driving circuits 200. The data driving circuit 200 can be implemented as a source driving integrated circuit (SDIC). When the data driving unit 120 is implemented in the chip on film (COF) scheme, the data driving circuit 200 can be mounted on a source circuit film (SF).

One side of the source circuit film (SF) can be electrically connected with the display panel 110. Lines for electrically connecting the source driving integrated circuit (SDIC) and the display panel 110 can be disposed on the source circuit film (SF).

The display device 100 according to an embodiment of the disclosure can include at least one source printed circuit board SPCB for circuit connection between one or more data driving circuits 200 and other devices and a control printed circuit board CPCB.

The other side of the source circuit film (SF) can be electrically connected with the source printed circuit board SPCB.

FIG. 2 illustrates an example in which the gate driving unit 130 in the display device 100 according to an embodiment of the disclosure is implemented in the chip on film (COF) scheme among various schemes (e.g., TAB, COG, COF, or GIP).

The gate driving unit 130 can include a gate driving integrated circuit GDIC. When the gate driving unit 130 is implemented in the chip on film (COF) scheme, the gate driving integrated circuit GDIC can be mounted on a gate circuit film (GF).

One side of the gate circuit film (GF) can be electrically connected with the display panel 110. Lines for electrically connecting the gate driving integrated circuit (GDIC) and the display panel 110 can be disposed on the gate circuit film (GF).

A controller 140 and a power management integrated circuit (PMIC) 240 can be mounted on the control printed circuit board CPCB. The controller 140 can control the data driving unit 120 and the gate driving unit 130. The power management integrated circuit 240 can supply a driving voltage or current to the display panel 110, the data driving unit 120, and the gate driving unit 130.

At least one source printed circuit board SPCB and the control printed circuit board CPCB can be circuit-connected through at least one connection member. The connection member can be, e.g., a flexible printed circuit (FPC) or a flexible flat cable (FFC).

At least one source printed circuit board SPCB and control printed circuit board CPCB can be integrated into one printed circuit board.

The display device 100 according to an embodiment of the disclosure can further include a set board 210 electrically connected with the control printed circuit board CPCB. A main power management circuit 220 for managing the overall power of the display device 100 can be disposed on the set board 210. The main power management circuit 220 can interwork with the power management integrated circuit 240.

The driving voltage generated by the set board 210 is transferred to the power management integrated circuit 240 in the control printed circuit board (CPCB). The power management integrated circuit 240 transfers a driving voltage necessary for driving the display device 100 or sensing characteristic values (e.g., sensing the characteristic values of the subpixels or sensing the input/output deviations of the analog-to-digital converter), through the connection member to the source printed circuit board SPCB. The power management integrated circuit 240 can supply a driving voltage to the data driving unit 120, the gate driving unit 130, or the display panel 110.

Figure 3:
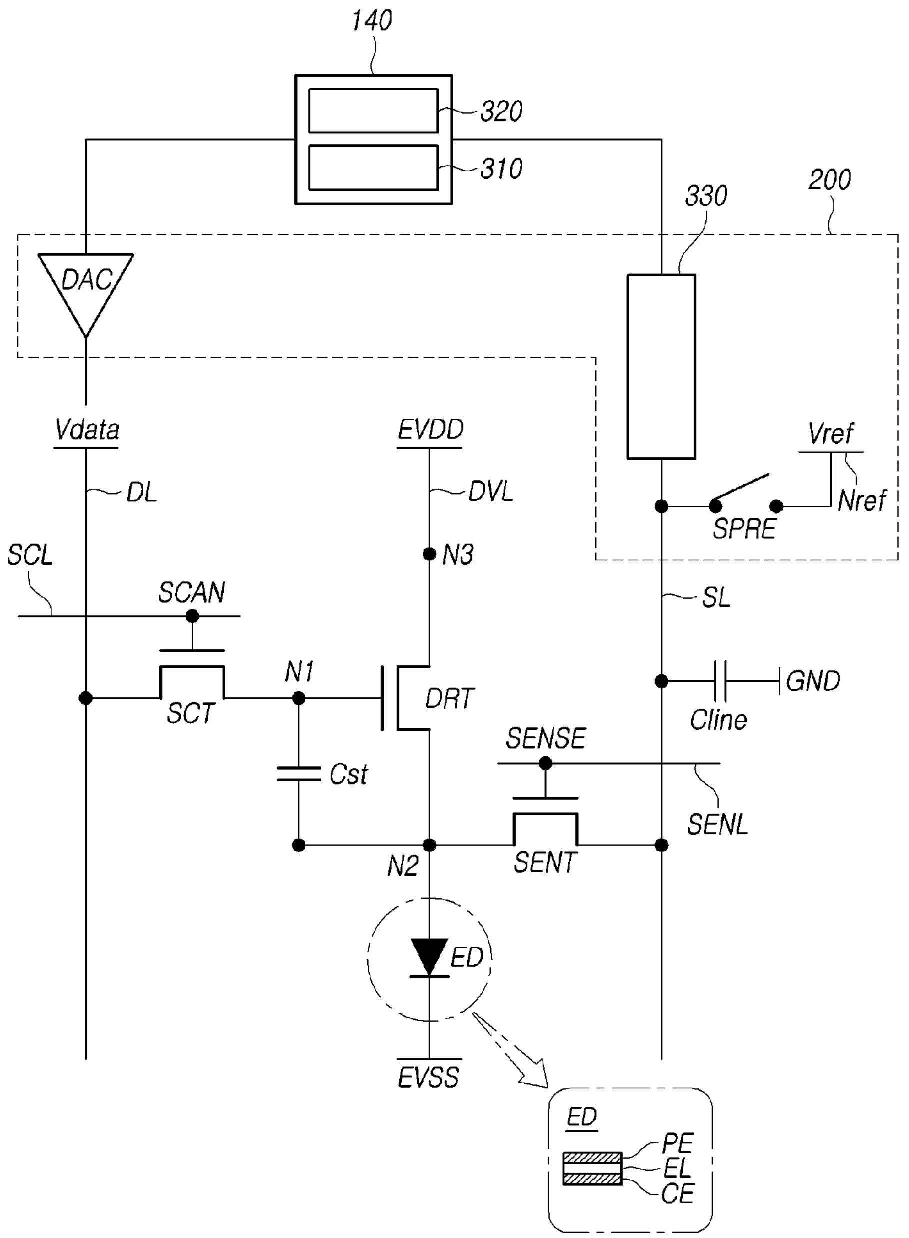
FIG. 3 is a view schematically illustrating an equivalent circuit of a subpixel SP and a configuration for compensating for characteristic values of the subpixel SP according to an embodiment of the disclosure.

FIG. 3 is a view schematically illustrating an equivalent circuit of a subpixel SP and a configuration for compensating for characteristic values of the subpixel SP according to an embodiment of the disclosure.

Referring to FIG. 3, each of a plurality of subpixels SP disposed on a display panel 110 of a display device 100 according to an embodiment of the disclosure can include a light emitting element ED, a driving transistor DRT, a scan transistor TSC, and a storage capacitor Cst.

The light emitting element ED can include a pixel electrode PE and a common electrode CE and can include a light emitting layer EL positioned between the pixel electrode PE and the common electrode CE.

The pixel electrode PE of the light emitting element ED can be an electrode disposed in each subpixel SP, and the common electrode CE can be an electrode commonly disposed in all the subpixels SP. Here, the pixel electrode PE can be an anode electrode, and the common electrode CE can be a cathode electrode. Conversely, the pixel electrode PE can be a cathode electrode, and the common electrode CE can be an anode electrode.

For example, the light emitting element ED can be an organic light emitting diode (OLED), a light emitting diode (LED), or a quantum dot light emitting element.

The driving transistor DRT is a transistor for driving the light emitting element ED, and can include a first node N1, a second node N2, and a third node N3.

The first node N1 of the driving transistor DRT can be a gate node of the driving transistor DRT, and can be electrically connected with a source node or a drain node of the scan transistor SCT. The second node N2 of the driving transistor DRT can be a source node or a drain node of the driving transistor DRT, and can be electrically connected with a source node or a drain node of the sensing transistor SENT and can also be electrically connected with the pixel electrode PE of the light emitting element ED. The third node N3 of the driving transistor DRT can be electrically connected with a driving voltage line DVL supplying a driving voltage EVDD.

The scan transistor SCT can be controlled by a scan pulse SCAN, which is a type of gate signal, and can be connected between the first node N1 of the driving transistor DRT and the data line DL. In other words, the scan transistor SCT can be turned on or off according to the scan pulse SCAN supplied from the scan line SCL, which is a type of the gate line GL, controlling the connection between the data line DL and the first node N1 of the driving transistor DRT.

The scan transistor SCT can be turned on by the scan pulse SCAN having a turn-on level voltage and transfer the data signal Vdata supplied from the data line DL to the first node N1 of the driving transistor DRT.

If the scan transistor SCT is an n-type transistor, the turn-on level voltage of the scan pulse SCAN can be a high level voltage. If the scan transistor SCT is a p-type transistor, the turn-on level voltage of the scan pulse SCAN can be a low level voltage.

The storage capacitor Cst can be electrically connected between the first node N1 and second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP can emit light.

Referring to FIG. 3, each of the plurality of subpixels SP disposed on the display panel 110 of the display device 100 can further include a sensing transistor SENT.

The sensing transistor SENT can be controlled by a sense pulse SENSE, which is a type of gate signal, and can be connected between the second node N2 of the driving transistor DRT and the sensing line SL. In other words, the sensing transistor SENT can be turned on or off according to the sense pulse SENSE supplied from the sense line SENL, which is another type of the gate line GL, controlling the connection between the sensing line SL and the second node N2 of the driving transistor DRT.

The sensing transistor SENT can be turned on by the sense pulse SENSE having a turn-on level voltage and transfer a reference voltage Vref supplied from the sensing line SL to the second node N2 of the driving transistor DRT. The sensing line SL is also referred to as a reference voltage line.

A reference voltage Vref can be applied to the sensing line SL through a reference voltage supply switch SPRE. One end of the reference voltage supply switch SPRE can be electrically connected to the sensing line SL, and the other end thereof can be electrically connected to the reference voltage supply node Nref to which the reference voltage Vref is supplied.

The sensing transistor SENT can be turned on by the sense pulse SENSE having a turn-on level voltage, transferring the voltage of the second node N2 of the driving transistor DRT to the sensing line SL.

If the sensing transistor SENT is an n-type transistor, the turn-on level voltage of the sense pulse SENSE can be a high level voltage. If the sensing transistor SENT is a p-type transistor, the turn-on level voltage of the sense pulse SENSE can be a low level voltage.

The function in which the sensing transistor SENT transfers the voltage of the second node N2 of the driving transistor DRT to the sensing line SL can be used upon driving to sense the characteristic value of the subpixel SP. In this situation, the voltage transferred to the sensing line SL can be a voltage for calculating the characteristic value of the subpixel SP or a voltage reflecting the characteristic value of the subpixel SP.

Each of the driving transistor DRT, the scan transistor SCT, and the sensing transistor SENT can be an n-type transistor or a p-type transistor. In embodiments of the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but can be an external capacitor intentionally designed outside the driving transistor DRT.

The scan line SCL and the sense line SENL can be different gate lines GL. In this situation, the scan pulse SCAN and the sense pulse SENSE can be separate gate signals, and the on-off timings of the scan transistor SCT and the on-off timings of the sensing transistor SENT in one subpixel SP can be independent. In other words, the on-off timings of the scan transistor SCT and the on-off timings of the sensing transistor SENT in one subpixel SP can be the same or different.

Alternatively, the scan line SCL and the sense line SENL can be the same gate line GL. In other words, the gate node of the scan transistor SCT and the gate node of the sensing transistor SENT in one subpixel SP can be connected with one gate line GL. In this situation, the scan pulse SCAN and the sense pulse SENSE can be the same gate signal, and the on-off timings of the scan transistor SCT and the on-off timings of the sensing transistor SENT in one subpixel SP can be identical.

The structure of the subpixel SP shown in FIG. 3 is merely an example, and various changes can be made thereto, e.g., such as including one or more transistors or one or more capacitors.

Although the structure of the subpixel is described with reference to FIG. 3 under the assumption that the display device 100 is a self-emission display device, if the display device 100 is a liquid crystal display, each subpixel SP can include a transistor and a pixel electrode.

Referring to FIG. 3, the display device 100 according to an embodiment of the disclosure can include a line capacitor Cline. The line capacitor Cline can be a capacitor element having one end electrically connected to the sensing line SL or can be a parasitic capacitor formed on the sensing line SL.

The sensing line SL can be electrically connected to the sensing unit 330 included in the data driving circuit 200. The sensing unit 330 can sense the voltage of the sensing line SL. The voltage sensed by the sensing unit 330 can be a voltage reflecting the characteristic value of the subpixel SP. Here, the sensing unit 330 is a section to senses a voltage of the characteristic value of the subpixel SP through the sensing line SL, and may be referred to as a sensing part or a sensing circuit.

In the disclosure, the characteristic value of the subpixel SP can be a characteristic value of the driving transistor DRT or the light emitting element ED. The characteristic value of the driving transistor DRT can include a threshold voltage and mobility of the driving transistor DRT. The characteristic value of the light emitting element ED can include a threshold voltage of the light emitting element ED.

The sensing unit 330 can further include a sampling switch and an analog-to-digital converter. In this situation, the sensing unit 330 can receive an analog voltage, convert it into a digital value, and output it to the controller 140.

The controller 140 can include a storage unit 310 storing characteristic value information about the subpixel SP and a compensation circuit that performs calculation for compensating for a change in the characteristic value of the subpixel SP based on the information stored in the storage unit 310.

The storage unit 310 can store information for compensating for the characteristic value of the subpixel SP. For example, the storage unit 310 can store information about the threshold voltage and mobility of the driving transistor DRT of each of the plurality of subpixels SP and information about the threshold voltage of the light emitting element ED included in the subpixel SP.

The compensation circuit 320 calculates the degree of change in the characteristic value of the corresponding subpixel SP based on the characteristic value information about the subpixel SP stored in the storage unit 310 and the digital value received from the sensing unit 330. The compensation circuit 320 updates the characteristic value of the subpixel SP stored in the storage unit 310.

The controller 140 compensates for image data by applying the change in the characteristic value of the subpixel SP, calculated by the compensation circuit 320, thereby driving the data driving unit 120.

The data voltage Vdata reflecting the change in the characteristic value of the subpixel SP can be output to the data line DL through the digital-to-analog converter DAC.

The process of sensing the change in the characteristic value of the subpixel SP and compensating for the same is referred to as a "subpixel characteristic value compensation process."

Figure 4:
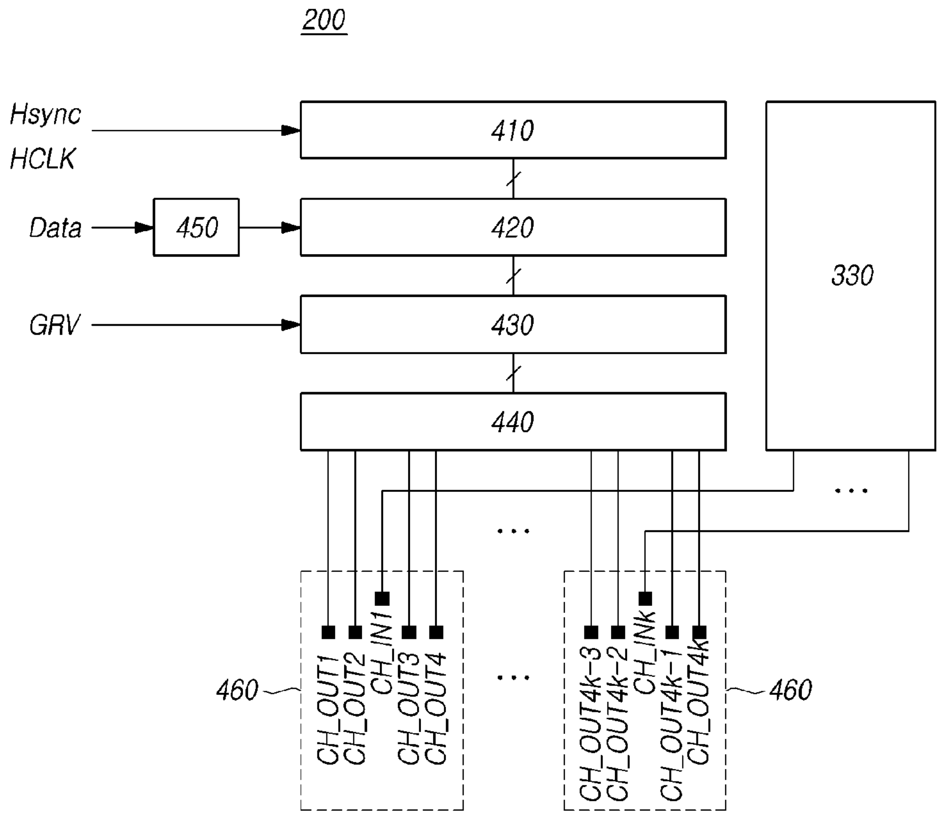
FIG. 4 is a view illustrating a data driving circuit of a display device according to an embodiment of the disclosure.

FIG. 4 is a view illustrating a data driving circuit 200 of a display device 100 according to an embodiment of the disclosure.

Referring to FIG. 4, the data driving circuit 200 can include a shift register unit 410, a latch unit 420, a digital-to-analog converting unit 430, an output buffer unit 440, a data receiving unit 450, and a sensing unit 330.

The data receiving unit 450 receives image data Data from the controller 140, converts it into predetermined bit digital data for each of the colors (e.g., RGB or RGBW) displayed by the plurality of subpixels SP included in the pixel array, and outputs the bit digital data.

The shift register unit 410 can include a plurality of shift registers to drive the plurality of data lines DL.

The plurality of shift registers can be configured to sequentially transfer the horizontal synchronization signal Hsync transmitted from the controller 140 in response to the horizontal clock signal HCLK.

The shift register unit 410 controls the driving time of the plurality of data lines DL using the horizontal synchronization signal Hsync and the horizontal clock signal HCLK. In other words, the horizontal synchronization signal Hsync and the horizontal clock signal HCLK are received from the controller 140, and all the data corresponding to one gate line GL which selects the horizontal synchronization signal Hsync as a start signal is synchronized with the horizontal clock signal HCLK and is sequentially sampled and stored in the latch unit 420.

The latch unit 420 can include a first latch unit including a plurality of first latches and a second latch unit including a plurality of second latches.

The plurality of first latches can receive and store image data to be provided to the subpixels SP of the gate line GL driven by the gate driving unit 130 among the plurality of gate lines GL.

The plurality of second latches receive and store data stored in a corresponding first latch among the plurality of first latches according to the next horizontal synchronization signal Hsync received from the controller 140.

The digital-to-analog converting unit 430 can include a plurality of digital-to-analog converters (DACs). The plurality of digital-to-analog converters (DACs) convert data stored in a corresponding second latch among the plurality of second latches into an analog data voltage.

The digital-to-analog converting unit 430 can receive a gamma reference voltage GRV from the outside and can convert the digital data stored in the second latch into an analog data voltage based on the received gamma reference voltage.

The output buffer unit 440 can include a plurality of output buffers. The plurality of output buffers can amplify the driving force of the data voltage output from a corresponding digital-to-analog converter among the plurality of digital-to-analog converters DAC and supply the amplified data voltage to the corresponding data line DL.

Each of the plurality of digital-to-analog converters DAC is electrically connected to one of the plurality of output terminals CH_OUT. The analog voltage output from the digital-to-analog converter DAC is transmitted to the output terminal CH_OUT connected to the corresponding digital-to-analog converter DAC.

Each of the plurality of data lines DL can be electrically connected to a corresponding output terminal CH_OUT.

In the data driving circuit 200 according to an embodiment of the disclosure, k (1≤k) sensing terminals CH_IN1 to CH_INk can be disposed, where k is a positive integer. The k sensing terminals CH_IN1 to CH_INk can be electrically connected to the sensing unit 330.

The sensing unit 330 can receive the analog voltage and convert it into a digital signal. The sensing unit 330 can include at least one analog-to-digital converter (ADC) for converting an analog voltage into a digital signal.

The data driving circuit 200 can output the converted digital signal to the controller 140.

An analog voltage can be applied to each of the k sensing terminals CH_IN1 to CH_INk. When the sensing terminal CH_IN is electrically connected to the sensing line SL, a voltage reflecting the characteristic value of the subpixel SP can be applied to the sensing terminal CH_IN.

Referring to FIG. 4, each of the k sensing terminals CH_IN1 to CH_INk, together with one or more output terminals CH_OUT, can constitute one input/output unit 460.

The first sensing terminal CH_IN1 and the four output terminals CH_OUT1, CH_OUT2, CH_OUT3, and CH_OUT4 constitute one input/output unit 460. The kth sensing terminal CH_INk, together with the four output terminals CH_OUT4k−3, CH_OUT4k−2, CH_OUT4k−1, and CH_OUT4k, constitutes one input/output unit 460.

Each of the plurality of subpixels SP is connected to the data line DL and the sensing line SL. The data line DL and the sensing line SL connected to one subpixel SP are electrically connected to the output terminal CH_OUT and the sensing terminal CH_IN, respectively, belonging to one input/output unit 460.

Figure 5:
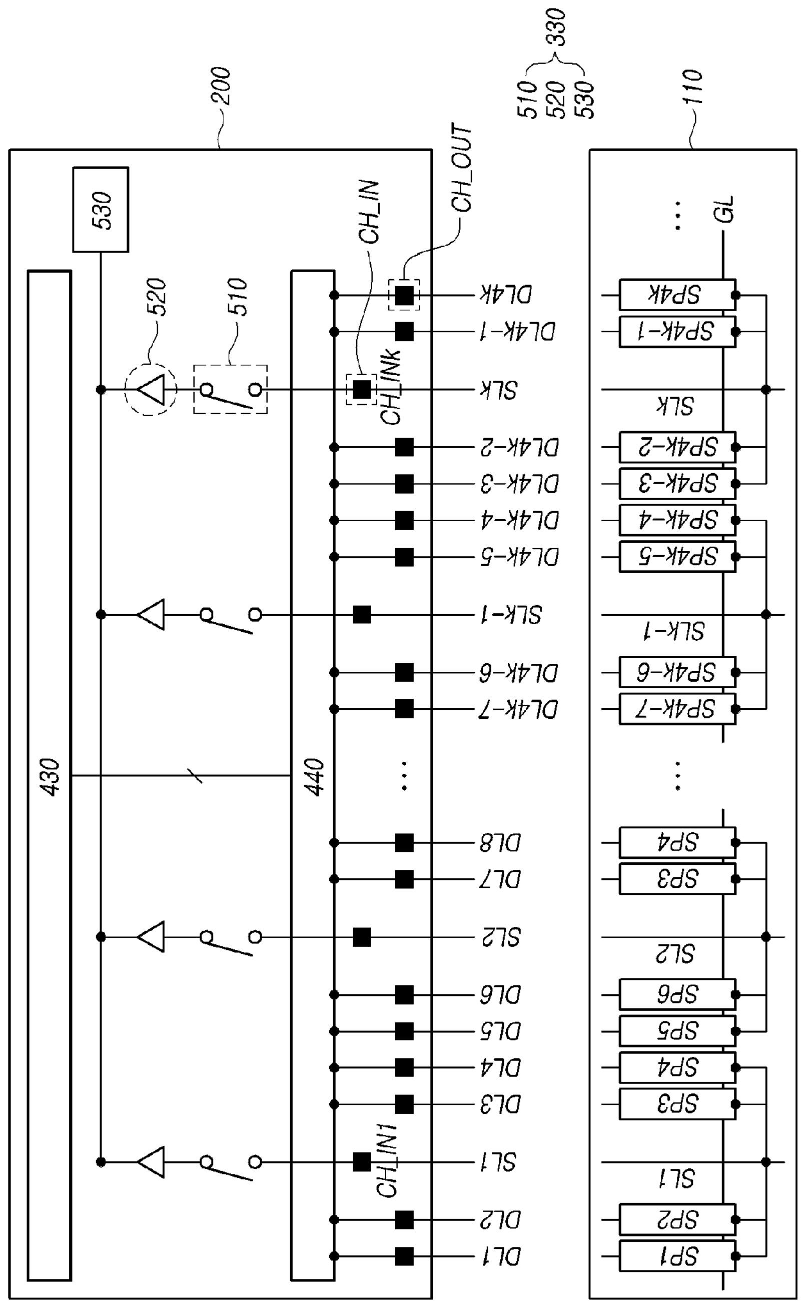
FIG. 5 is a view illustrating a connection relationship between a sensing terminal, an output terminal, a sensing line, and a data line of a display device according to an embodiment of the disclosure.

FIG. 5 is a view illustrating a connection relationship between a sensing terminal CH_IN, an output terminal CH_OUT, a sensing line SL, and a data line DL of a display device 100 according to an embodiment of the disclosure.

Referring to FIG. 5, the k sensing terminals CH_IN1 to CH_INk disposed on the data driving circuit 200 can be electrically connected to the k sensing lines SL1 to SLk among the plurality of sensing lines SL disposed on the display panel 110. The output terminals CH_OUT, which, together with the k sensing terminals CH_IN1 to CH_INk, constitutes one input/output unit 460, are each electrically connected with the data line DL.

Referring to FIG. 5, the first output terminal CH_IN1 is electrically connected to the first sensing line SL1. The four output terminals CH_OUT1, CH_OUT2, CH_OUT3, and CH_OUT4, which, together with the first output terminal CH_IN1, constitute one input/output unit 460, are electrically connected to the corresponding data lines DL1, DL2, DL3 and DL4, respectively.

The first sensing line SL1 electrically connected to the first sensing terminal CH_IN1 is electrically connected to the four subpixels SP1, SP2, SP3, and SP4 receiving the gate voltage from the same gate line GL.

The four subpixels SP1, SP2, SP3, and SP4 receive data voltages through the four data lines DL1, DL2, DL3, and DL4, respectively.

The four data lines DL1, DL2, DL3, and DL4 are electrically connected to the four output terminals CH_OUT1, CH_OUT2, CH_OUT3, and CH_OUT4, respectively, and the four output terminals CH_OUT1, CH_OUT2, CH_OUT3, and CH_OUT4, together with the first sensing terminal CH_IN1, constitute one input unit 460.

The sensing unit 330 can include a plurality of sampling switches 510, a plurality of sampling and hold circuits 520, and at least one analog-to-digital converter 530.

The analog-to-digital converter 530 can receive analog voltages from k sensing terminals CH_IN1 and CH_INk.

Each of the plurality of sampling and hold circuits 520 measures the voltage of one sensing terminal CH_IN electrically connected with the corresponding sampling and hold circuit 520 among the k sensing terminals CH_IN1 to CH_INk. The measured voltage can be output to the analog-to-digital converter 530. In other words, the plurality of sampling and hold circuits 520 output the sampled analog voltage to the analog-to-digital converter 530.

One end of each of the plurality of sampling switches 510 is electrically connected to the sampling and hold circuit 520, and the other end is electrically connected to the sensing terminal CH_IN.

Referring to FIG. 5. all k sensing terminals CH_IN1 to CH_INk disposed in the data driving circuit 200 can be electrically connected to the sensing line SL. In this situation, there is no unused sensing terminal CH_IN among the k sensing terminals CH_IN1 to CH_INk.

The use of all the sensing terminals CH_IN disposed in the data driving circuit 200 can be possible, e.g., when the data driving circuit 200 is differently designed depending on the specifications of the display panel 110.

The specifications of the display panel 110 can be, e.g., information about the size of the display panel 110 or information about which sensing terminal CH_IN among the sensing terminals CH_IN of the data driving circuit 200 is to be connected with the sensing line SL.

The numbers of sensing terminals CH_IN and output terminals CH_OUT of the data driving circuit 200 required for each specification of the display panel 110 can vary.

For example, detailed specifications of the display panel 110 can be as follows. The size of the display panel 110 can be size A. The display panel 110 having size A can require, e.g., a data driving circuit 200 having 960 output terminals CH_OUT1 to CH_OUT960 and 240 sensing terminals CH_IN1 to CH_IN240.

Accordingly, the data driving circuit 200 should be designed to have 960 output terminals CH_OUT1 to CH_OUT960 and 240 sensing terminals CH_IN1 to CH_IN240 to drive the display panel 110 having size A.

As another example, detailed specifications of the display panel 110 can be as follows. The size of the display panel 110 can be size B. The display panel 110 having size B can require, e.g., a data driving circuit 200 having 912 output terminals CH_OUT1 to CH_OUT912 and 228 sensing terminals CH_IN1 to CH_IN228.

Accordingly, the data driving circuit 200 should be designed to have 912 output terminals CH_OUT1 to CH_OUT912 and 228 sensing terminals CH_IN1 to CH_IN228 to drive the display panel 110 having size B.

As another example, detailed specifications of the display panel 110 can be as follows. The size of the display panel 110 can be size C. The display panel 110 having size C can require, e.g., a data driving circuit 200 having 640 output terminals CH_OUT1 to CH_OUT640 and 160 sensing terminals CH_IN1 to CH_IN160.

Accordingly, the data driving circuit 200 should be designed to have 640 output terminals CH_OUT1 to CH_OUT640 and 160 sensing terminals CH_IN1 to CH_IN160 to drive the display panel 110 having size C.

As another example, detailed specifications of the display panel 110 can be as follows. The size of the display panel 110 can be size D. The display panel 110 having size D can require, e.g., a data driving circuit 200 having 480 output terminals CH_OUT1 to CH_OUT480 and 120 sensing terminals CH_IN1 to CH_IN120.

Accordingly, the data driving circuit 200 should be designed to have 480 output terminals CH_OUT1 to CH_OUT480 and 120 sensing terminals CH_IN1 to CH_IN120 to drive the display panel 110 having size D.

For the above reasons, the number of sensing terminals CH_IN of the data driving circuit 200 required for each specification of the display panel 110 is different, and it is difficult to use the same type data driving circuit 200 for the four different types of display panels A, B, C and D.

Figure 6:
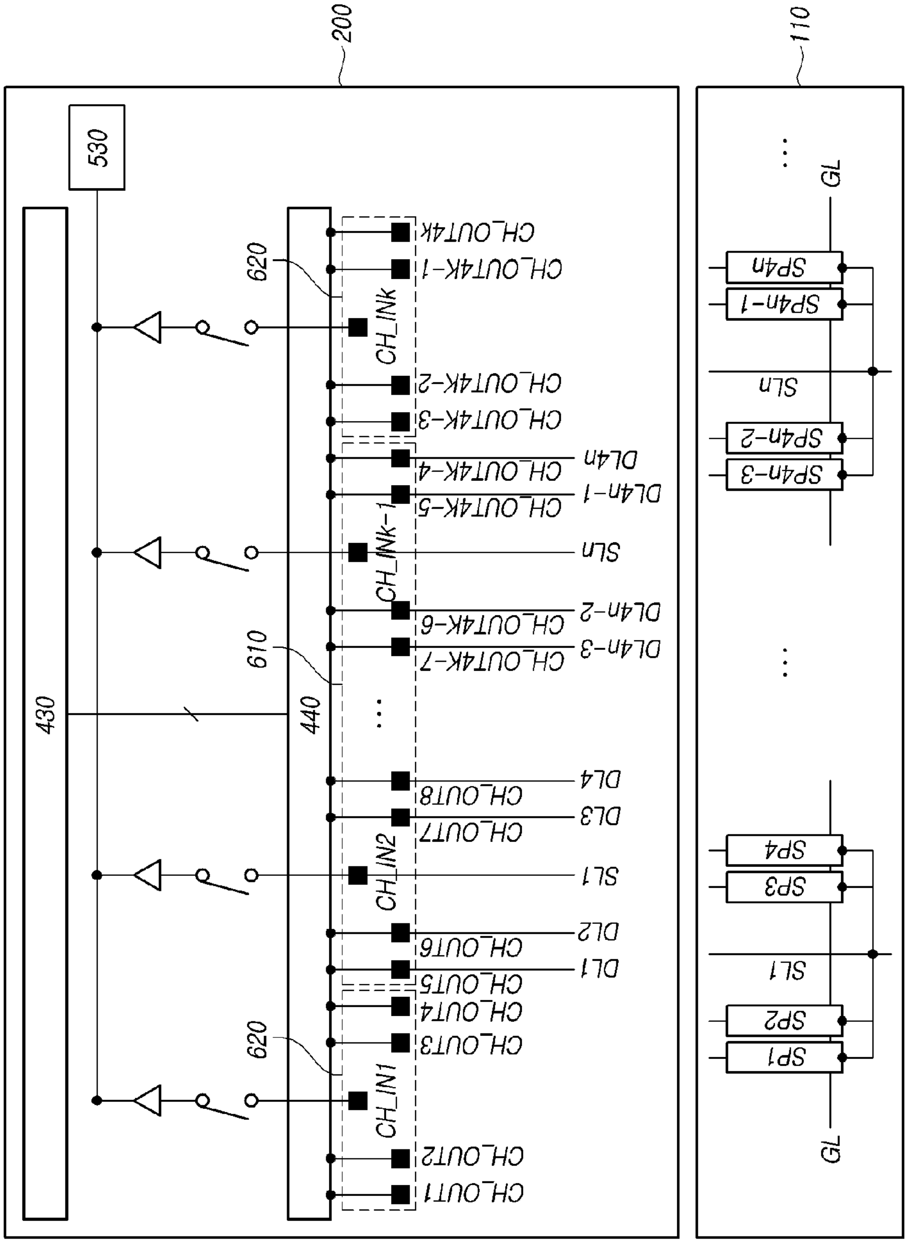
FIG. 6 is a view illustrating an example of a sensing terminal floating issue due to common use of a data driving circuit.

FIG. 6 is a view illustrating an example of a sensing terminal (CH_IN) floating issue due to common use of a data driving circuit 200.

Referring to FIG. 6, although k sensing terminals CH_IN1 to CH_INk are disposed in the data driving circuit 200, the number of sensing terminals CH_IN electrically connected to the sensing line SL among the k sensing terminals CH_IN1 to CH_INk can be less than k.

For example, among the k sensing terminals CH_IN1 to CH_INk disposed in the data driving circuit 200, only n ($1 \leq n < k$) sensing terminals CH_IN can be electrically connected with the sensing line SL, and the remaining k−n sensing terminals CH_IN among the k sensing terminals CH_IN1 to CH_INk may not be electrically connected with the sensing line SL.

Referring to FIG. 6, two sensing terminals CH_IN1 and CH_INk among k sensing terminals CH_IN1 to CH_INk can be sensing terminals CH_IN disposed in the second sensing terminal area 620 not connected to the sensing line SL. Among the k sensing terminals CH_IN1 to CH_INk, the remaining sensing terminals CH_IN2 to CH_INk−1 except for the two sensing terminals CH_IN1 and CH_INk disposed in the second sensing terminal area 620 can be electrically connected with the corresponding sensing lines SL, respectively. The sensing terminals CH_IN2 to CH_INk−1 electrically connected to the sensing line SL can be disposed in the first sensing terminal area 610.

In the display device 100 of FIG. 6, the two sensing terminals CH_IN1 and CH_INk disposed in the second sensing terminal area 620 are in a floating state where a constant voltage is not applied. For example, the two sensing terminals CH_IN1 and CH_INk are not connected to a corresponding sensing line SL because there are more sensing terminals in the data driving circuit 200 than there are sensing lines SL in the display panel 110 (e.g., the data driving circuit 200 is sized larger than the display panel 110 in this situation, thus some of the extra/unused sensing terminals are not connected to any sensing line and will be in a floated state).

For example, when a data driving circuit 200 optimized to drive the display panel 110 having size A is used in the display panel 110 having size B, which size B is smaller than size A, some sensing terminals CH_IN disposed in the corresponding driving circuit 200 can be in the floating state. When the sensing terminal CH_IN is in the floating state, electrical stability of the corresponding driving circuit 200 can be degraded. For example, when the data driving circuit 200 is sized larger than the display panel 110, there will be some sensing terminals that go unused and exist in a floated state. Since these unused sensing terminals are floated, unknown or unwanted voltages can occur on the unused sensing terminals which can cause a problem or interference for the display device (e.g., such as causing the data driving circuit 200 to enter into an unstable state).

Therefore, to commonly use the same type of data driving circuit 200 in different types of display panels 100 having different specifications, a process for applying a constant voltage to the unused sensing terminals CH_IN disposed in the second sensing terminal area 620 is desired. For example, the first sensing terminal area 610 corresponds to an area where each of the sensing terminals is connected to a corresponding sensing line in the display panel 110, while the second sensing terminal area 620 corresponds to an area where extra sensing terminals exist that are not connected to any sensing lines in the display panel 110, because the data driving circuit 200 is sized larger than the display panel 110 and can also be applied other types of display panels having larger or smaller sizes than display panel 110.

Figure 7:
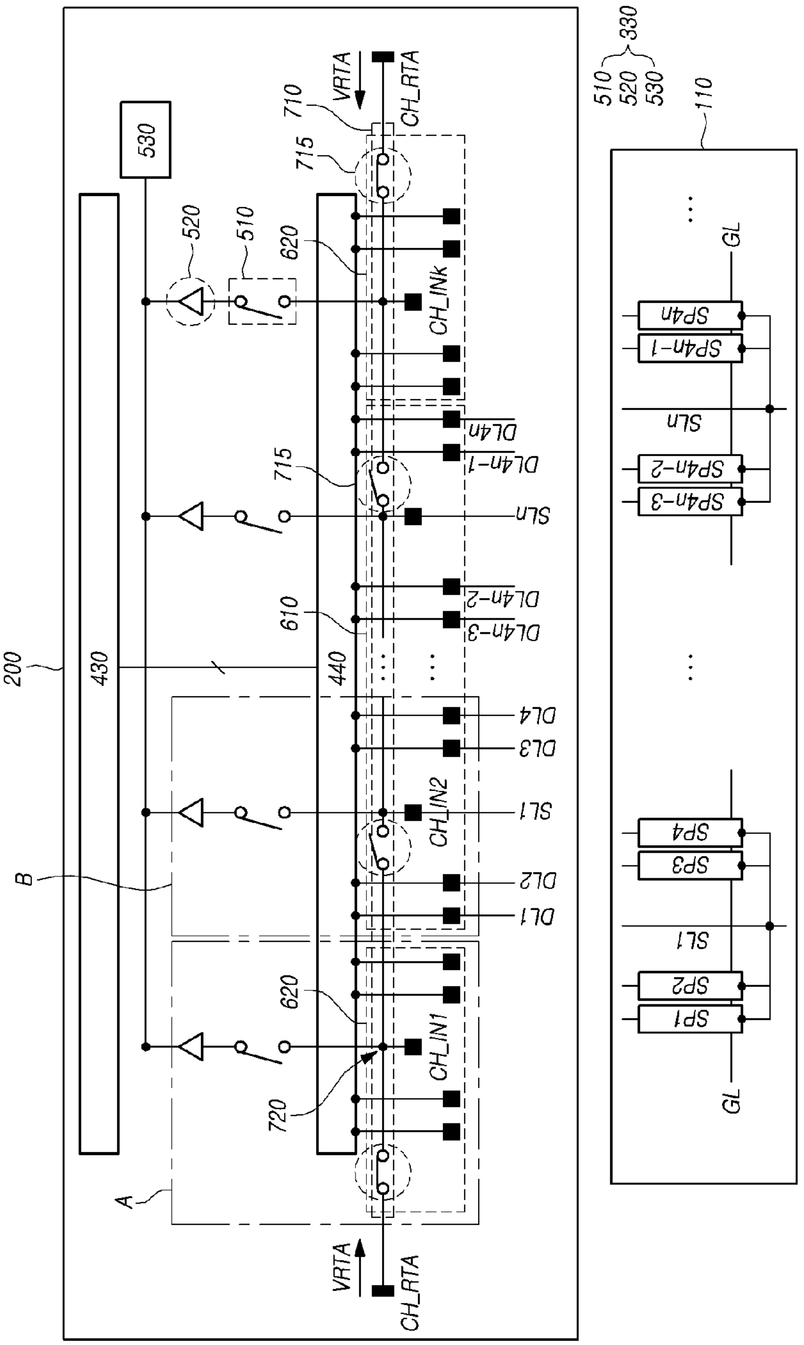
FIG. 7 is a view illustrating a data driving circuit and a display panel according to an embodiment of the disclosure.

FIG. 7 is a view illustrating a data driving circuit 200 and a display panel 110 according to an embodiment of the disclosure.

The display device 100 according to an embodiment of the disclosure includes a display panel 110 and one or more data driving circuits 200 electrically connected to the display panel 110.

Each of the one or more data driving circuits 200 can include a digital-to-analog converting unit 430, a sensing unit 330, and a switching unit 710.

The switching unit 710 can include one or more switching elements 715. Here, the switching unit 710 is a section to control the electrical connection with the sensing terminal CH_IN, and may be referred to as a switching part or a switching circuit.

One or more switching elements 715 are electrically connected to the sensing terminal CH_IN via the sensing terminal branch node 720.

A plurality of subpixels SP and a plurality of sensing lines SL electrically connected to the plurality of subpixels SP are disposed on the display panel 110.

As illustrated in FIG. 7, each of the plurality of sensing lines SL can be electrically connected to n ($1 \leq n \leq k$) sensing terminals CH_IN among k sensing terminals CH_IN1 to CH_INk disposed in each of the one or more data driving circuits 200. Each of the plurality of data lines DL corresponds to any one output terminal CH_OUT of the plurality of output terminals CH_OUT disposed in each of the one or more data driving circuits 200, and each data line DL can be electrically connected to the output terminal CH_OUT.

Every n sensing lines SL can be electrically connected to one of the one or more data driving circuits 200. When the display device 100 can include two or more data driving circuits 200, the plurality of sensing lines SL are divided into each n ($1 \leq n \leq k$) sensing lines SL which are connected to a data driving circuit among the two or more data driving circuits 200.

Among the k sensing terminals CH_IN1 to CH_INk disposed in each of the one or more data driving circuits 200, n sensing terminals CH_IN are electrically connected to a corresponding sensing line SL.

Referring to FIG. 7, in the display device 100 according to embodiments of the disclosure, among the k sensing terminals CH_IN1 to CH_INk, n ($1 \leq n \leq k$) sensing terminals CH_IN can be electrically connected with the corresponding sensing line SL, and the remaining k−n sensing terminals CH_IN among the k sensing terminals CH_IN1 to CH_INk may not be electrically connected to any sensing line SL. For example, the first sensing terminal area 610 corresponds to an area where each of the sensing terminals is connected to a corresponding sensing line in the display panel 110, while the second sensing terminal area 620 corresponds to an area where extra sensing terminals exist that are not connected to any sensing lines in the display panel 110, because the data driving circuit 200 is sized larger than the display panel 110.

Also, n ($1 \leq n < k$) sensing terminals CH_IN connected with corresponding sensing lines SL among the k sensing terminals CH_IN1 to CH_INk can be positioned further inside than the remaining k−n sensing terminals CN_IN not connected with the sensing line SL. In other words, the unused k−n sensing terminals CH_IN not connected to any sensing line SL can be positioned further outside than the n sensing terminals CH_IN electrically connected to the sensing line SL.

In other words, the second sensing terminal area 620 can be positioned outside the first sensing terminal area 610. To put it another way, a center of a smaller sized display panel can be aligned with a center of a larger sized data driving circuit 200 when connecting sensing lines to sensing terminals (e.g., see area 610), so that extra unused sensing terminals will exists at the outer edges of the data driving circuit 200 (e.g., see areas 620).

The sensing terminal CH_IN positioned in the second sensing terminal area 620 (e.g., the unused sensing terminal area) is electrically connected to the constant voltage supply terminal CH_RTA. Also, a constant voltage VRTA is applied to the corresponding sensing terminal CH_IN in the second sensing terminal area 620 and any unused sensing terminals can be prevented from entered into a floating state.

Among the one or more switching elements 715, the switching element 715 having one end connected to the sensing terminal branch node 720 of the sensing terminal CH_IN disposed in the second sensing terminal area 620 can be turned on (e.g., in order to supply the constant voltage VRTA to unused sensing terminals located at the outer edges).

Among the one or more switching elements 715, the switching element 715 having one end connected to the sensing terminal branch node 720 of the sensing terminal CH_IN disposed in the first sensing terminal area 610 can be turned off (e.g., in order to prevent the constant voltage VRTA from being applied to a sensing terminal that is actually being used and is connected to a corresponding sensing line SL in the display panel 110).

Accordingly, the voltage applied to the sensing line SL can be supplied to the sensing terminal CH_IN disposed in the first sensing terminal area 610. The constant voltage VRTA can be applied to the sensing terminal CH_IN disposed in the second sensing terminal area 620. In other words, used sensing terminals can receive voltages from their corresponding sensing lines from the display panel, while used sensing terminals that are not connected to any sensing line in the display panel can be supplied with the constant voltage VRTA.

Referring to FIG. 7, the first sensing terminal CH_IN1 and the kth sensing terminal CH_INk are not electrically connected to a corresponding sensing line SL (e.g., the outermost sensing terminals can go unused), and the remaining sensing terminals, i.e., the second sensing terminal to the k−1th sensing terminal CH_IN2 to CH_INk−1 can be electrically connected to the plurality of sensing lines SL, respectively.

The first sensing terminal CH_IN1 and the kth sensing terminal CH_INk are the sensing terminals CH_IN positioned in the second sensing terminal area 620 (e.g., the unused area). The remaining sensing terminals, i.e., the second to k−1th sensing terminals CH_IN2 to CH_INk−1, are sensing terminals CH_IN positioned in the first sensing terminal area 610 (e.g., the used area).

Referring to FIG. 7, the second sensing terminal area 620 is positioned outside the first sensing terminal area 610. In this way, it is easier to supply the constant voltage VRTA to unused sensing terminals because they are located towards the outer edges and be easier to access, thus reducing wiring requirements.

One end of the switching element 715 corresponding to the first sensing terminal CH_IN1 is electrically connected to the sensing terminal branch node 720 of the first sensing terminal CH_IN1. The other end of the corresponding switching element 715 is electrically connected to the constant voltage supply terminal CH_RTA. The constant voltage VRTA is applied to the other end of the corresponding switching element 715.

The first sensing terminal CH_IN1 is not electrically connected to a sensing line SL (e.g., the first sensing terminal CH_IN1 goes unused). Accordingly, the switching element 715 corresponding to the first sensing terminal CH_IN1 can be turned on and, the constant voltage VRTA is applied to the corresponding first sensing terminal CH_IN1 through switching element 715.

One end of the switching element 715 corresponding to the kth sensing terminal CH_INk is electrically connected to the sensing terminal branch node 720 of the kth sensing terminal CH_INk. The other end of the corresponding switching element 715 is electrically connected to the constant voltage supply terminal CH_RTA. The constant voltage VRTA is applied to the other end of the corresponding switching element 715.

The kth sensing terminal CH_INk is not electrically connected to a sensing line SL (the kth sensing terminal CH_INk goes unused). Accordingly, the switching element 715 corresponding to the kth sensing terminal CH_INk can be turned on and, the constant voltage VRTA is applied to the kth sensing terminal CH_Ink through the switching element 715 corresponding to the kth sensing terminal CH_INk.

Constant voltage supply terminals CH_RTA can be positioned at two opposite ends of the switching unit 710. One or more switching elements 715 included in the switching unit 710 can be connected in series between the constant voltage supply terminals CH_RTA of two opposite ends. Since the constant voltage supply terminals CH_RTA and the unused sensing terminal are positioned at the opposite outer ends, wiring can be reduced for supplying the constant voltage to the unused sensing terminals.

In the display device 100 according to an embodiment of the disclosure, the analog-to-digital converter 530 can sense an analog voltage applied to each of the k sensing terminals CH_IN1 to CH_INk.

The analog-to-digital converter 530 can sense the voltage applied to the sensing terminals CH_IN positioned in the first sensing terminal area 610. The voltage applied to the corresponding sensing terminals CH_IN in the first sensing terminal area 610 can be a voltage reflecting the characteristic value of the subpixel SP. The voltage level of the voltage reflecting the characteristic value of the subpixel SP can vary depending on the sensing timing.

However, the analog-to-digital converter 530 can also sense the voltage applied to the sensing terminals CH_IN positioned in the second sensing terminal area 620. The voltage applied to the corresponding sensing terminals CH_IN in the second sensing terminal area 620 can all have the same voltage level as the constant voltage VRTA supplied from the constant voltage supply terminal CH_RTA.

The voltage input from the sensing terminal CH_IN positioned in the second sensing terminal area 620 can be a voltage whose voltage level does not vary according to the sensing period (e.g., a constant steady voltage level of a predetermined value).

The display device 100 according to an embodiment of the disclosure can compensate for the characteristic value of the analog-to-digital converter 530 using the characteristic that a predetermined voltage level of constant voltage VRTA is applied to the sensing terminal CH_IN disposed in the second sensing terminal area 620. A detailed description of the characteristic value compensation process of the analog-to-digital converter 530 is described below.

In sum, the display device 100 according to an embodiment of the disclosure of FIG. 7 can provide a display device 100 in which the constant voltage VRTA is applied to the sensing terminals CH_IN that are not electrically connected to corresponding sensing lines SL from the display panel. Accordingly, the data driving circuit 200 can be commonly used for display panels 110 having various specifications. In other words, one type of data driving circuit 200 can be applied to different types of display panels 110 (e.g., display panels of different sizes or areas).

The sizes of the first sensing terminal area 610 and the second sensing terminal area 620 of the data driving circuit 200 can vary depending on the specifications of the display panel 110 driven by the data driving circuit 200.

Specifically, the sizes of the first sensing terminal area 610 and the second sensing terminal area 620 can be varied depending on how many sensing terminals CH_IN among the k sensing terminals CH_IN1 to CH_INk included in the data driving circuit 200 are to be electrically connected with sensing lines SL.

Figure 8:
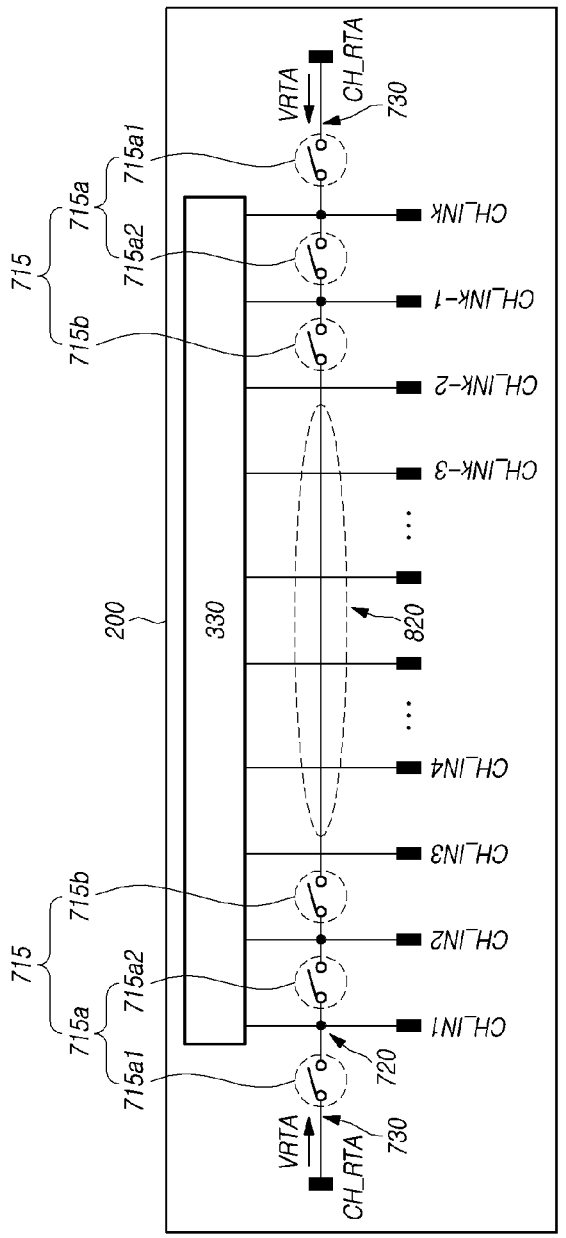
FIG. 8 is a view illustrating a data driving circuit having one or more switching elements of FIG. 7 according to an embodiment of the disclosure.

FIG. 8 is a view illustrating a data driving circuit 200 of FIG. 7 having one or more switching elements 715 according to an embodiment of the disclosure.

The data driving circuit 200 according to an embodiment of the disclosure of FIG. 8 includes k sensing terminals CH_IN1 to CH_INk, a constant voltage supply terminal CH_RTA, and a plurality of switching elements 715.

In FIG. 8, the plurality of switching elements 715 can be connected in series with each other.

In the disclosure of FIG. 8, the plurality of switching elements 715 can include a switching element **715*a* belonging to a first group (e.g., left side group or outer group) and a switching element 715*b*** belonging to a second group (e.g., a right side group or inner group).

The switching element **715*a* belonging to the first group is defined as a switching element whose ON/OFF is determined depending on whether a specific sensing channel CH_IN among the plurality of switching elements 715** is electrically connected with a sensing line SL or not.

Referring to FIG. 8, the leftmost switching element **715*a*1 and the rightmost switching element 715*a*1 each are turned on if the first sensing terminal CH_IN1 or the kth sensing terminal CH_INk is electrically connected to a corresponding sensing line SL, and otherwise, if they are not connected to corresponding sensing lines then the switching elements 715*a*1 are turned off. Accordingly, since the leftmost switching element 715*a*1 and the rightmost switching element 715*a*1 are switching elements whose ON/OFF status is determined depending on whether the first sensing terminal CH_IN1 or the kth sensing terminal CH_INk is electrically connected with a sensing line SL, they are switching elements 715*a*** belonging to the first group.

Referring to FIG. 8, the second leftmost switching element **715*a*2 and the second rightmost switching element 715*a*2 each are turned on if the second sensing terminal CH_IN2 or the k−1th sensing terminal CH_INk−1 is electrically connected to a sensing line SL, and otherwise, if these sensing terminals are not connected to corresponding sensing lines SL, then switching element 715*a*2 are turned off. Accordingly, since the second leftmost switching element 715*a*2 and the second rightmost switching element 715*a*2 are switching elements whose ON/OFF status is determined depending on whether the second sensing terminal CH_IN2 or the k−1th sensing terminal CH_INk−1 is electrically connected with a sensing line SL, they are switching elements 715*a*** belonging to the first group.

The switching element **715*b* belonging to the second group is defined as a switching element whose ON/OFF status is determined depending only on the states of the switching elements 715*a*** belonging to the first group.

The switching elements **715*b* belonging to the second group can be the innermost two switching elements 715*b* among the plurality of switching elements 715 connected in series. The switching elements 715*b* belonging to the second group can be the remaining two switching elements 715*b* except for the switching elements 715*a* belonging to the first group among the plurality of switching elements 715** connected in series.

Referring to the disclosure of FIG. 8, the plurality of switching elements 715 can be divided and positioned in the same number in the left area and the right area with respect to the middle line of the data driving circuit 200.

The switching elements **715*b* belonging to the second group include the innermost switching element 715*b* among the switching elements 715 disposed in the left area of the data driving circuit 200 when the plurality of switching elements 715 are connected in series. The switching elements 715*b* belonging to the second group include the innermost switching element 715*b* among the switching elements 715 disposed in the right area of the data driving circuit 200 when the plurality of switching elements 715** are connected in series.

In sum, the plurality of switching elements 715 according to an embodiment of the disclosure of FIG. 8 can include m (m≥1) switching elements 715 belonging to the first group and two switching elements belonging to the second group, where m is a positive integer and an even number.

The constant voltage supply terminal CH_RTA supplies the constant voltage VRTA to the constant voltage supply line 730.

The m switching elements 715*a* belonging to the first group can be switching elements 715 corresponding to any one sensing terminal CH_IN of the k sensing terminals CH_IN1 to CH_INk. Each of the one or more switching elements 715*a* belonging to the first group is electrically connected to the sensing terminal branch node 720 of the sensing terminal CH_IN corresponding to the corresponding switching element 715*a*.

One or more switching elements 715*a* belonging to the first group can be turned on or off depending on whether the sensing terminal CH_IN corresponding to the corresponding switching element 715*a* is electrically connected to a sensing line SL from the display panel.

A constant voltage VRTA or a voltage of the sensing line SL can be applied to the sensing terminal CH_IN disposed corresponding to the m switching elements 715*a* belonging to the first group.

Referring to FIG. 8, six switching elements 715 can be connected in series.

Among the six switching elements 715 connected in series, the remaining four switching elements 715*a* except for the innermost two switching elements 715*b* are disposed corresponding to a first sensing terminal CH_IN1, a second sensing terminal CH_IN2, a k−1th sensing terminal CH_INk−1, and a kth sensing terminal CH_INk. In this situation, m=4 (e.g., the two outermost switching elements on the left side and the two outermost switching elements on the right side).

The two switching elements 715*b* belonging to the second group (e.g., the innermost pair of switches) can be electrically connected to each other through the switching element connection line 820.

Each of the two switching elements 715*b* belonging to the second group is electrically connected with any one switching element 715*a*2 among one or more switching elements 715*a* belonging to the first group. The respective other ends of the two switching elements 715*b* belonging to the second group are electrically connected to each other through the switching element connection line 820.

The two switching elements 715*b* belonging to the second group can be turned on only when one or more switching elements 715*a* belonging to the first group are all turned on, e.g., since they are configured in series.

If one or more switching elements 715*b* belonging to the second group are turned on, the constant voltage VRTA is applied to all, of the one or more switching elements 715*a* belonging to the first group and the one or more switching elements 715*b* belonging to the second group.

Accordingly, the voltage drop at the sensing terminal branch node 720 can be minimized (e.g., since the constant voltage VRTA can be supplied to opposite ends of the constant voltage supply line 730).

Referring to FIG. 8, the sensing terminal branch node 720 may not exist in some sensing terminals CH_IN among the k sensing terminals CH_IN1 to CH_INk. The sensing terminals CH_IN which lack the sensing terminal branch node 720 are connected to none of the one or more switching elements 715. Such sensing terminals CH_IN can be sensing terminals CH_IN that are always electrically connected to the sensing line SL regardless of the specifications of the display panel 110 (e.g., such as sensing terminals CH_IN located towards the center of the data driving circuit 200, which will almost always be connected to a corresponding sensing line SL from the display panel even when the data driving circuit 200 is applied to small display panels).

Referring to FIG. 8, the first sensing terminal CH_IN1, the second sensing terminal CH_IN2, the k−1th sensing terminal CH_INk−1, and the kth sensing terminal CH_INk can be, or may not be, connected to the sensing line SL depending on the specifications of the display panel 110 (e.g., depending on whether the display panel has a large area or a small area).

In contrast, the third sensing terminal CH_IN3 to the k−2th sensing terminal CH_INk−2 can be the sensing terminals CH_IN connected to the sensing line SL regardless of the specifications of the display panel 110.

Among the k sensing terminals CH_IN1 to CH_INk, the third sensing terminal CH_IN3 to the k−2th sensing terminal CH_INk−2 are electrically connected to the sensing line SL. In other words, n=k−4 sensing terminals CH_IN are electrically connected to the sensing line SL.

Also, m, n, and k are positive integers and satisfy the equation of k=m+n.

If the number of sensing lines SL connected to the data driving circuit 200 including k sensing terminals CH_IN1 to CH_INk and m switching elements 715*a* increases, n increases.

In sum, the equation k≤mn is satisfied.

The k sensing terminals CH_IN1 to CH_INk include m sensing terminals CH_IN which the switching elements 715 are disposed corresponding to. The k sensing terminals CH_IN1 to CH_INk include n sensing terminals CH_IN electrically connected to the sensing line SL.

The above-described m sensing terminals CH_IN can be constituted of only different sensing terminals CH_IN, and the above-described n sensing terminals CH_IN can be constituted of only different sensing terminals CH_IN. Alternatively, the m sensing terminals CH_IN and the n sensing terminals CH_IN may include any one sensing terminal CH_IN in duplicate.

Each of the k sensing terminals CH_IN1 to CH_INk can be any one sensing terminal CH_IN of the m sensing terminals CH_IN or any one sensing terminal CH_IN among the n sensing terminals CH_IN.

For the reasons as described above, the display device 100 according to an embodiment of the disclosure can meet the equation k≤m+n. Accordingly, the configuration of the data driving circuit 200 can be simplified.

Figure 9:
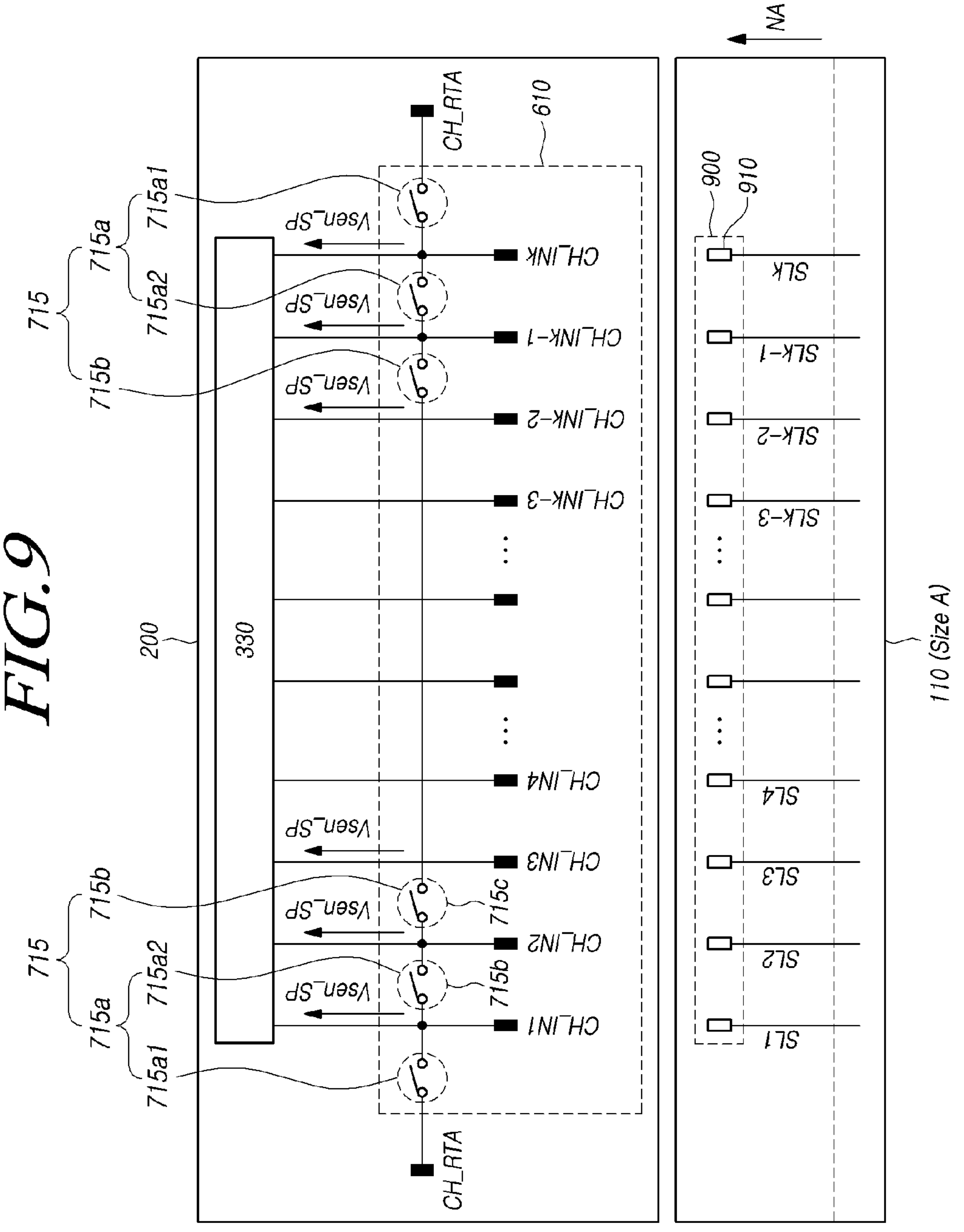
FIG. 9 is a view illustrating operations of one or more switching elements in a situation where all sensing terminals of a data driving circuit are connected with a sensing line in the display device of FIG. 7 according to an embodiment of the disclosure.

FIG. 9 is a view illustrating operations of one or more switching elements 715 when all sensing terminals CH_IN1 to CH_INk of the data driving circuit 200 in the display device 100 of FIG. 7 are electrically connected with the sensing line SL. For example, in this situation the data driving circuit 200 is sized to equally match the size of the display panel, thus all switching elements 715 remain in the open position or off state.

The display device 100 according to an embodiment of the disclosure of FIG. 9 can include one or more data driving circuits 200 and a display panel 110 having size A.

The pad portion 900 can be positioned in the non-display area NA of the display panel 110. A plurality of connection pads 910 respectively connected to the plurality of sensing lines SL can be positioned in the pad portion 900.

Each of the plurality of connection pads 910 is electrically connected to a corresponding sensing line SL among the plurality of sensing lines SL.

Each of the plurality of connection pads 910 is electrically connected to any one of the k sensing terminals CH_IN1 to CH_INk of the data driving circuit 200. For example, when the data driving circuit 200 is positioned on the circuit film, the plurality of connection pads 910 can be electrically connected to the sensing terminals CH_IN to CH_INk through lines on the circuit film.

Referring to FIG. 9, when the data driving circuit 200 is connected to the display panel 110 having size A, all k sensing terminals CH_IN1 to CH_INk can be connected to the sensing lines SL, respectively. In this situation, all of the k sensing terminals CH_IN1 to CH_INk are positioned in the first sensing terminal area 610.

If all of the k sensing terminals CH_IN to CH_INk disposed in each of the one or more data driving circuits 200 are electrically connected to a sensing line SL, the data driving circuit 200 does not have the second sensing terminal area 620 but has only the first sensing terminal area 610 (e.g., in this situation, none of the sensing terminals go unused because the display panel is so large that it matches the size of the data driving circuit).

One or more switching elements 715*a* belonging to the first group can all be turned off, and the k sensing terminals CH_IN1 to CH_INk are electrically connected to the corresponding sensing lines SL, respectively, and the constant voltage VRTA, supplied from the constant voltage supply terminal CH_RTA, is applied to none of the k sensing terminals CH_IN1 to CH_INk.

The one or more switching elements 715*b* belonging to the second group are turned off because it is not the situation where the one or more switching elements 715*a* belonging to the first group are all turned on.

Accordingly, the data driving circuit 200 in which the k sensing terminals CH_IN1 to CH_INk are disposed can be used in the display device 100 including the display panel 110 having size A.

Figure 10:
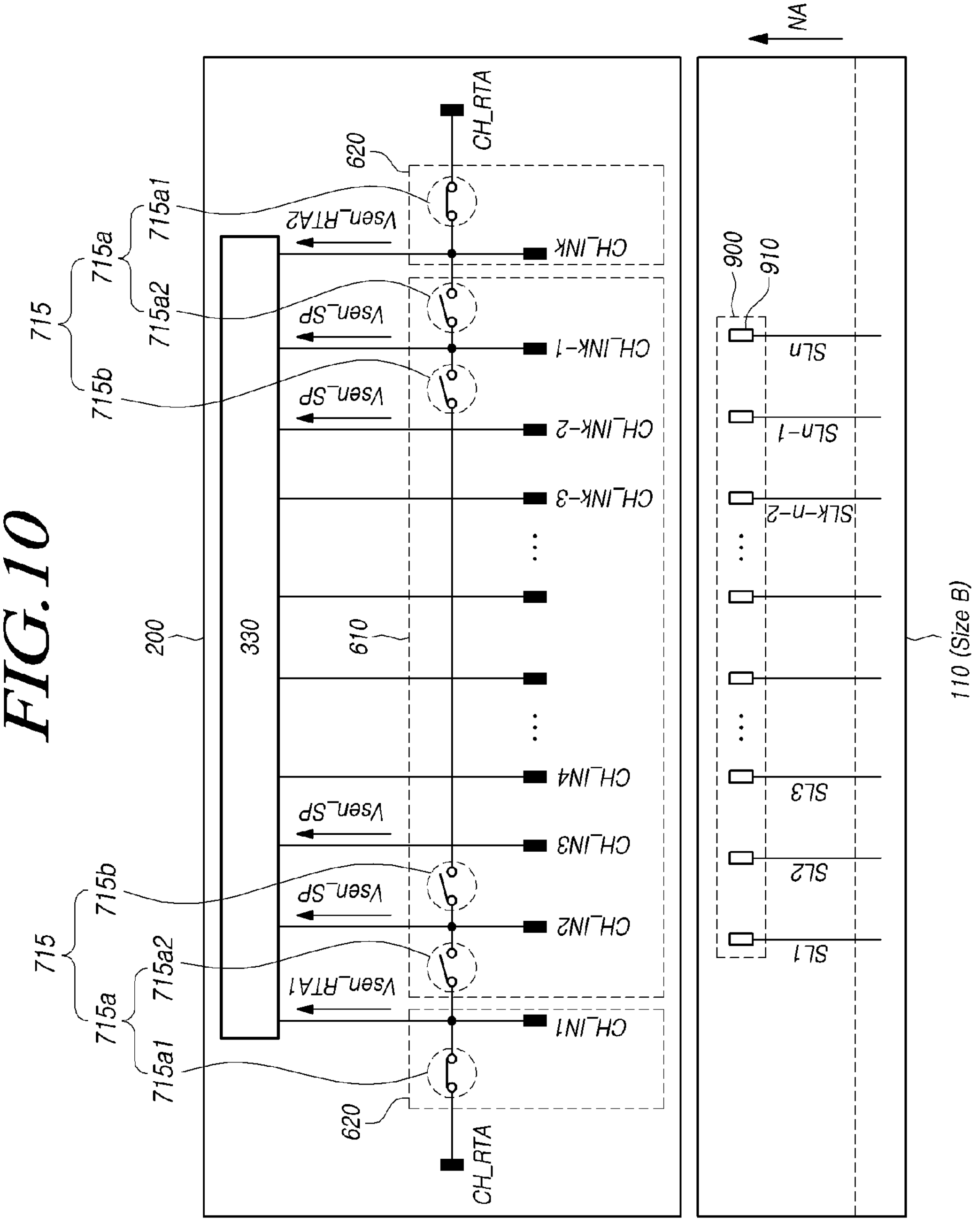
FIG. 10 is a view illustrating operations of one or more switching elements in a situation where some sensing terminals of a data driving circuit are not electrically connected with a sensing line in the display device of FIG. 7 according to an embodiment of the disclosure.

FIG. 10 is a view illustrating operations of one or more switching elements 715 in a situation where some sensing terminals CH_IN of a data driving circuit 200 are not electrically connected with any corresponding sensing line SL in the display device 100 of FIG. 7.

Referring to FIG. 10, the display panel 110 having size B can be connected to one or more data driving circuits 200.

For each of one or more data driving circuits 200, the first sensing terminal CH_IN1 and the kth sensing terminal CH_INk among the k sensing terminals CH_IN1 to CH_INk are not electrically connected with the sensing line SL, and the second sensing terminal CH_IN2 to the k−1th sensing terminal CH_INk−1 can be electrically connected with the sensing line SL (e.g., the outermost sensing terminals go unused in this situation and are connected to the constant voltage supply terminal CH_RTA and supplied with a compensation sensing voltage Vsen_RTA).

If among the k sensing terminals CH_IN1 to CH_INk disposed in each of the one or more data driving circuits 200, n (1≤n≤k) sensing terminals CH_IN only are electrically connected with the plurality of sensing lines SL, both the first sensing terminal area 610 and the second sensing terminal area 620 can exist in each of the one or more data driving circuits 200.

The second sensing terminal area 620 can be positioned outside the first sensing terminal area 610.

Referring to FIG. 10, among the one or more switching elements 715*a* belonging to the first group, the switching elements 715*a*1 corresponding to the first sensing terminal CH_IN1 and the kth sensing terminal CH_INk are turned on. The first sensing terminal CH_IN1 and the kth sensing terminal CH_INk are electrically connected to the constant voltage supply terminal CH_RTA.

Among the one or more switching elements 715*a* belonging to the first group, the switching elements 715*a*2 corresponding to the second sensing terminal CH_IN2 and the k−1th sensing terminal CH_INk−1 are turned off. The second sensing terminal CH_IN2 and the k−1th sensing terminal CH_INk−1 are electrically connected to a corresponding sensing line SL.

The one or more switching elements 715*b* belonging to the second group are turned off because it is not the situation where the one or more switching elements 715*a* belonging to the first group are all turned on.

Accordingly, the data driving circuit 200 in which the k sensing terminals CH_IN1 to CH_INk are disposed can be used in the display device 100 including the display panel 110 having size B.

Referring to FIG. 10, the sensing unit 330 can sense each of the k sensing terminals CH_IN1 to CH_INk (e.g., even the outer sensing terminals that go unused by the display panel can still be sensed by the sensing unit 330).

The sensing unit 330 senses the sensing terminal CH_IN disposed in the first sensing terminal area 610 and receives a voltage Vsen_SP reflecting the characteristic value of the subpixel SP.

The sensing unit 330 senses the sensing terminal CH_IN disposed in the second sensing terminal area 620 and receives an analog voltage.

In this situation, the voltage sensed by the sensing terminal CH_IN positioned in the second sensing terminal area 620 is a voltage which does not reflect the change in the characteristic value of the subpixel SP and exhibits little deviation according to the sensing period. Accordingly, such a voltage can be used to compensate for the deviation of the characteristic value of the analog-to-digital converter 530. For example, since the outer sensing terminals are unused when a small display panel is applied (e.g., not connected to any sensing line from the display panel), these outer sensing terminals can be repurposed and used to help compensate for issues in the data driving circuit 200.

The voltage that the analog-to-digital converter inputs by sensing the sensing terminal CH_IN positioned in the second sensing terminal area 620 can be referred to as an ADC compensation sensing voltage Vsen_RTA.

Referring to FIG. 10, the sensing unit 330 can sense the first sensing terminal CH_IN1 to receive the first ADC compensation sensing voltage Vsen_RTA1. The sensing unit 330 can sense the kth sensing terminal CH_INk to receive the second ADC compensation sensing voltage Vsen_RTA2.

Referring to FIG. 10, the sensing unit 330 senses each of the second sensing terminal to the k−1th sensing terminal CH_IN2 to CH_INk−1 and receives the voltage Vsen_SP reflecting the characteristic value of the subpixel SP.

Figure 11:
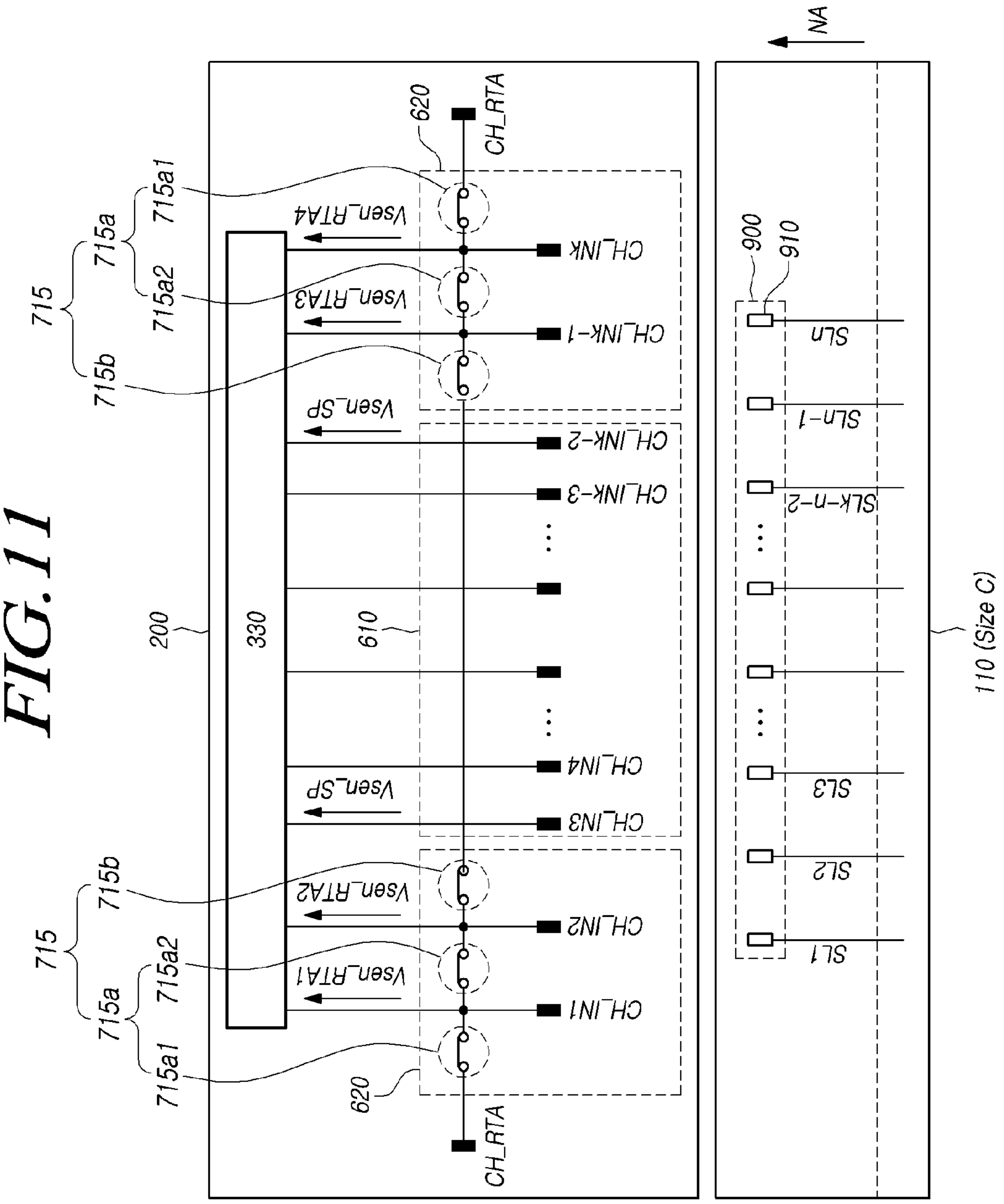
FIG. 11 is a view illustrating operations of one or more switching elements in another situation where some sensing terminals of a data driving circuit are not electrically connected with a sensing line in the display device of FIG. 7 according to an embodiment of the disclosure.

FIG. 11 is a view illustrating operations of one or more switching elements 715 in another situation where some sensing terminals CH_IN of a data driving circuit 200 are not electrically connected with any sensing line SL in the display device 100 of FIG. 7.

The display device 100 according to an embodiment of the disclosure of FIG. 11 can include one or more data driving circuits 200 and a display panel 110 having size C.

For each of one or more data driving circuits 200, the first sensing terminal CH_IN1, the second sensing terminal CH_IN2, the k−1th sensing terminal CH_INk−1, and the kth sensing terminal CH_INk among the k sensing terminals CH_IN1 to CH_INk are not electrically connected with the sensing line SL, and the third sensing terminal CH_IN3 to the k−2th sensing terminal CH_INk−2 can be electrically connected with the sensing line SL.

Referring to FIG. 11, one or more switching elements 715*a* belonging to the first group are all turned on. The one or more switching elements 715*b* belonging to the second group are turned on because it is the situation where the one or more switching elements 715*a* belonging to the first group are all turned on.

The first sensing terminal CH_IN1, the second sensing terminal CH_IN2, the k−1th sensing terminal CH_INk−1, and the kth sensing terminal CH_INk are electrically connected to the constant voltage supply terminal CH_RTA.

Accordingly, the data driving circuit 200 in which the k sensing terminals CH_IN1 to CH_INk are disposed can be used in the display device 100 including the display panel 110 having size C.

The analog-to-digital converter 530 senses the sensing terminal CH_IN disposed in the first sensing terminal area 610 and receives a voltage Vsen_SP reflecting the characteristic value of the subpixel SP.

The analog-to-digital converter 530 senses the sensing terminal CH_IN disposed in the second sensing terminal area 620 and receives the ADC compensation sensing voltage Vsen_RTA via the closed switching elements 715.

Referring to FIG. 11, the sensing unit 330 senses the first sensing terminal CH_IN1 and receives the first ADC compensation sensing voltage Vsen_RTA1. The sensing unit 330 senses the second sensing terminal CH_IN2 and receives the second ADC compensation sensing voltage Vsen_RTA2. The sensing unit 330 senses the k−1th sensing terminal CH_INk−1 and receives the third ADC compensation sensing voltage Vsen_RTA3. The sensing unit 330 senses the kth sensing terminal CH_INk and receives the fourth ADC compensation sensing voltage Vsen_RTA4.

Referring to FIG. 11, the sensing unit 330 senses each of the third sensing terminal CH_IN3 to the k−2th sensing terminal CH_INk−2 and receives the voltage Vsen_SP reflecting the characteristic value of the subpixel SP.

Figure 12:
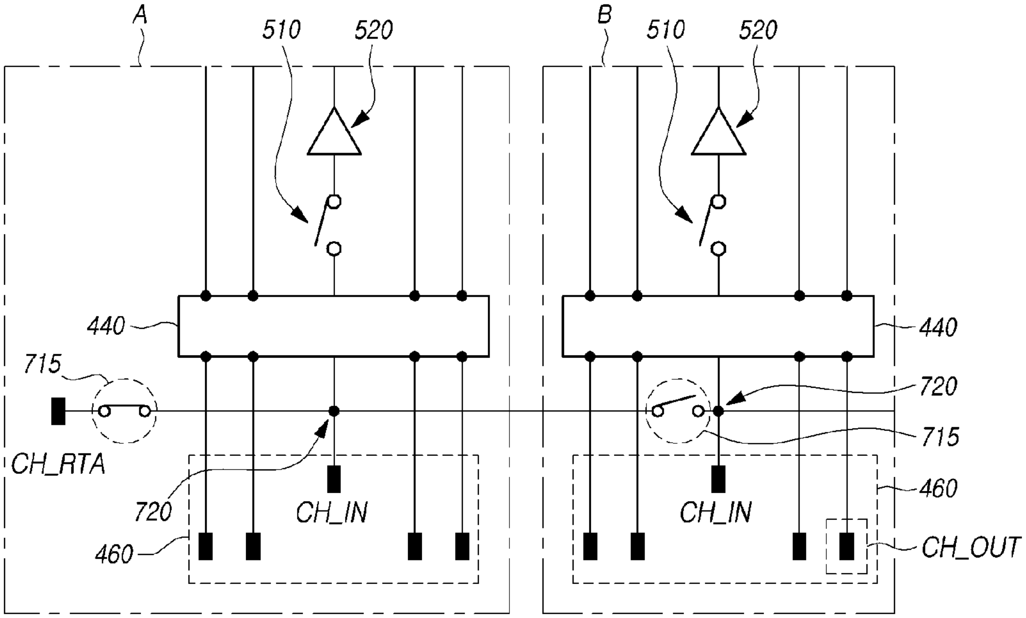
FIG. 12 is a view illustrating operations of various circuit elements disposed in a first sensing terminal area and a second sensing terminal area and a voltage applied to a specific node in the display device of FIG. 7 according to an embodiment of the disclosure.

FIG. 12 is a view illustrating operations of various circuit elements disposed in a first sensing terminal area 610 and a second sensing terminal area 620 and a voltage applied to a specific node in the display device 100 of FIG. 7.

Referring to FIG. 12, area A corresponds to the second sensing terminal area 620 because the sensing terminal CH_IN is not electrically connected to the sensing line SL. Region B corresponds to the first sensing terminal area 610 because the sensing terminal CH_IN is electrically connected to the sensing line SL.

The sensing terminal CH_IN of area A is not electrically connected to the sensing line SL. The output terminal CH_OUT of area A is not electrically connected to the data line DL. When the input/output unit 460 has the above-described connection relationship with the sensing line SL and the data line DL, the corresponding input/output unit 460 can be defined as a "first input/output unit."

The sensing terminal CH_IN of area B is electrically connected to the sensing line SL. The output terminal CH_OUT of area B is electrically connected to the data line DL. When the input/output unit 460 has the above-described connection relationship with the sensing line SL and the data line DL, the corresponding input/output unit 460 can be defined as a "second input/output unit."

The switching element 715 disposed corresponding to the sensing terminal CH_IN of area A is in an ON state. The sensing terminal CH_IN of area A is electrically connected to the constant voltage supply terminal CH_RTA.

The sampling and hold circuit 520 in area A can sample the voltage of the sensing terminal branch node 720 electrically connected to the corresponding sampling and hold circuit 520. The voltage of the corresponding node can be the ADC compensation sensing voltage Vsen_RTA.

Since the output terminal CH_OUT of area A is not electrically connected to the data line DL, the digital-to-analog converter DAC connected to the corresponding data line DL does not output a voltage.

The output terminal CH_OUT of area A is not electrically connected to the data line DL. If the digital-to-analog converter DAC does not output a voltage, the constant voltage may not be applied to the output terminal CH_OUT of area A. The corresponding output terminal CH_OUT can be in a floating state.

The switching element 715 disposed corresponding to the sensing terminal CH_IN of area B is in an OFF state. The sensing terminal CH_IN of area B is electrically connected to the sensing line SL.

The sampling and hold circuit 520 in area B can sample the voltage of the sensing terminal branch node 720 electrically connected to the corresponding sampling and hold circuit 520. The voltage of the corresponding node can be a voltage Vsen_SP reflecting the characteristic value of the subpixel SP.

The output terminal CH_OUT of area B is electrically connected to the data line DL. A plurality of digital-to-analog converters DAC output analog data voltages to corresponding data lines DL.

The output terminal CH_OUT of area B is electrically connected to the data line DL. The output terminal CH_OUT of area B can receive a constant voltage from the digital-to-analog converter DAC.

Figure 13:
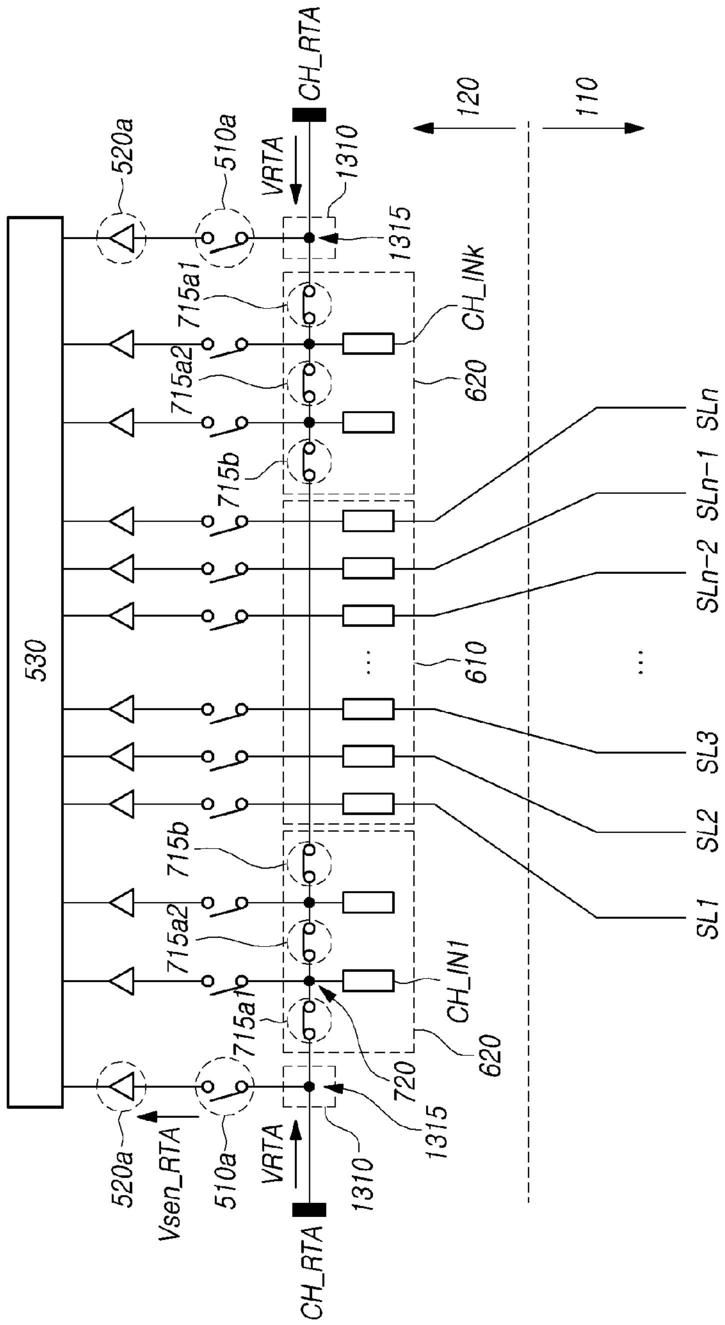
FIG. 13 is a view illustrating a first sensing terminal area, a second sensing terminal area, and a dummy area in a display device according to an embodiment of the disclosure.

FIG. 13 is a view illustrating a first sensing terminal area 610, a second sensing terminal area 620, and a dummy area 1310 in a display device 100 according to an embodiment of the disclosure.

The display device 100 according to an embodiment of the disclosure can further include a dummy area 1310 in the data driving circuit 200.

A dummy node 1315 can be positioned in the dummy area 1310. The dummy node 1315 can be positioned between the constant voltage supply terminal CH_RTA and the switching element 715.

The display device 100 according to an embodiment of the disclosure of FIG. 13 can include a switching element 715*a*1 corresponding to the first sensing terminal CH_IN1.

Referring to FIG. 13, the outermost switching element 715*a*1 among the one or more switching elements 715 is disposed corresponding to the outermost sensing terminal CH_IN1 among the k sensing terminals CH_IN1 to CH_INk.

The switching element 715*a*1 disposed corresponding to the first sensing terminal CH_IN1 can have one end electrically connected to the sensing terminal branch node 720 of the first sensing terminal CH_IN1 and the other end electrically connected to the constant voltage supply terminal CH_RTA.

The dummy node 1315 can be positioned between the switching element 715*a*1 disposed corresponding to the first sensing terminal CH_IN1 and the constant voltage supply terminal CH_RTA.

Similarly, the dummy node 1315 can also be positioned between the switching element 715 disposed corresponding to the kth sensing terminal CH_INk and the constant voltage supply terminal CH_RTA.

The constant voltage VRTA is applied to the dummy node 1315 from the constant voltage supply terminal CH_RTA regardless of whether the above-described one or more switching elements 715 are operated.

The display device 100 according to an embodiment of the disclosure of FIG. 13 can further include a dummy node sampling and hold circuit 520*a* and a dummy node sampling switch 510*a*.

The dummy node sampling and holding circuit 520*a* can sample the voltage of the dummy node 1315. The dummy node sampling and hold circuit 520*a* can output an ADC compensation sensing voltage Vsen_RTA to the analog-to-digital converter 530.

The dummy node sampling switch 510*a* includes one end electrically connected to the dummy node sampling and hold circuit 520*a* and the other end electrically connected to the dummy node 1315. As the display device 100 according to an embodiment of the disclosure of FIG. 13 further includes the dummy area 1310 and the dummy node 1315, even when all of the k sensing terminals CH_IN1 to CH_INk disposed in the data driving circuit 200 are electrically connected with the sensing line SL, the ADC compensation sensing voltage Vsen_RTA can be input to the analog-to-digital converter 530.

Figure 14:
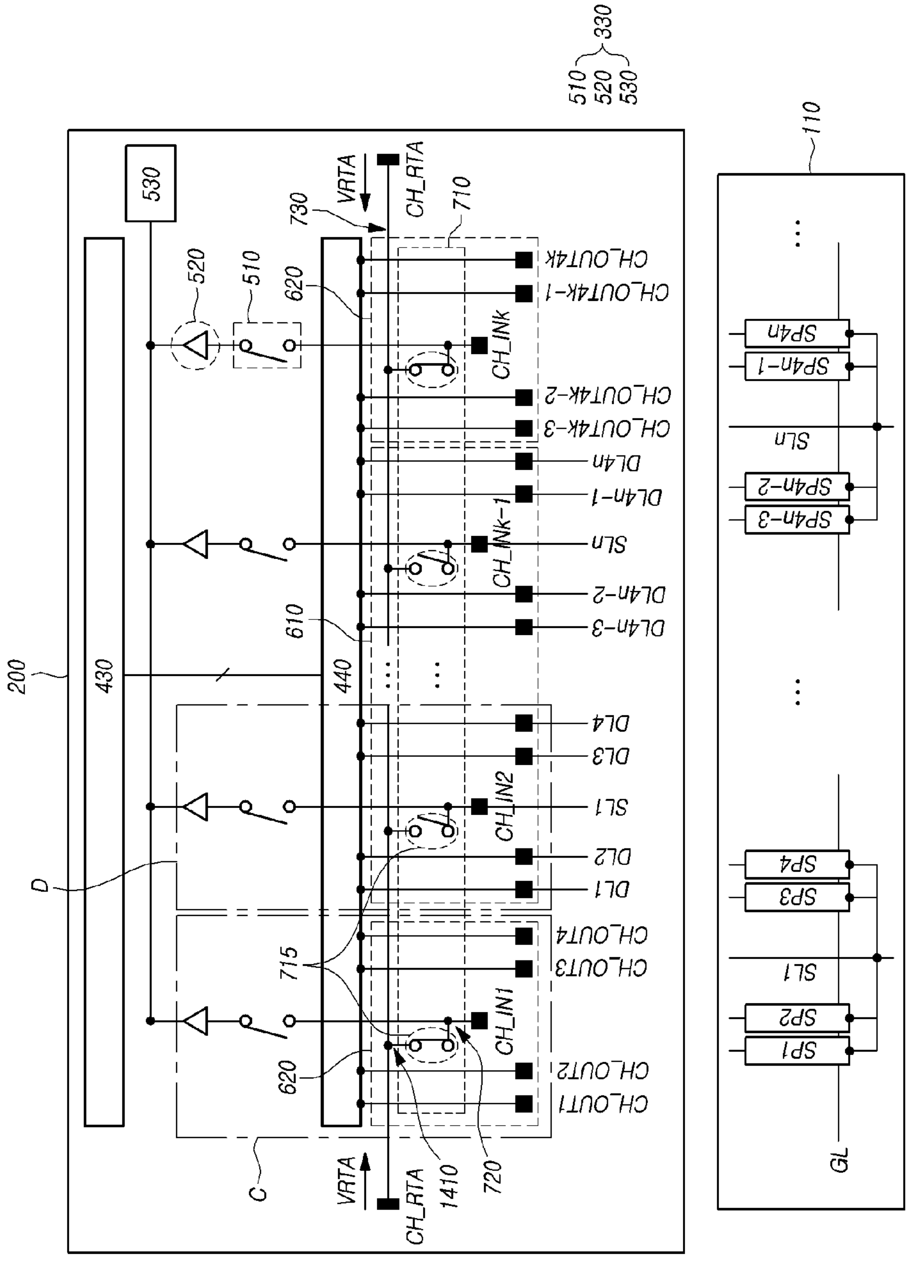
FIG. 14 is a view illustrating a display device according to an embodiment of the disclosure.

FIG. 14 is a view illustrating a display device 100 according to an embodiment of the disclosure.

Referring to FIG. 14, the display device 100 according to an embodiment of the disclosure includes a display panel 110 and one or more data driving circuits 200 electrically connected to the display panel 110.

In this situation, k sensing terminals CH_IN1 to CH_INk and a plurality of output terminals CH_OUT are disposed in each of one or more data driving circuits 200.

The data driving circuit 200 includes a constant voltage supply terminal CH_RTA. The constant voltage supply terminal CH_RTA supplies the constant voltage VRTA to the constant voltage supply line 730.

Each of the one or more data driving circuits 200 can include a latch unit 420, a digital-to-analog converting unit 430, a sensing unit 330, and a switching unit 710.

The sensing unit 330 can include a plurality of sampling switches 510, a plurality of sampling and hold circuits 520, and at least one analog-to-digital converter 530.

The switching unit 710 can include one or more switching elements 715.

One end of each of one or more switching elements 715 are electrically connected to the sensing terminal CH_IN via the sensing terminal branch node 720. The other end of each of the one or more switching elements 715 are electrically connected to the constant voltage supply terminal CH_RTA via the constant voltage source branch node 1410.

The constant voltage source branch node 1410 is a node to which the switching element 715 and the constant voltage supply line 730 are electrically connected.

Referring to the disclosure of FIG. 14, each of one or more switching elements 715 can be disposed corresponding to one sensing terminal CH_IN. Each of one or more switching elements 715*a* can be turned on or off depending on whether the sensing terminal CH_IN corresponding to the corresponding switching element 715 is electrically connected to the sensing line SL.

Referring to the disclosure of FIG. 14, when the switching unit 710 includes a plurality of switching elements 715, the plurality of switching elements 715 are not connected in series with each other.

The ON/OFF state of each of the plurality of switching elements 715 according to an embodiment of the disclosure of FIG. 14 is determined depending on whether any one of the m sensing terminals CH_IN is electrically connected to a sensing line SL.

For example, in the disclosure of FIG. 14, the first sensing terminal CH_IN1 is not electrically connected to the sensing line SL. The switching element 715 having one end electrically connected to the sensing terminal branch node 720 of the first sensing terminal CH_IN1 is turned on.

If the switching element 715 is turned on (e.g., placed in the closed position), the sensing terminal CH_IN corresponding to the corresponding switching element 715 is electrically connected to the constant voltage supply terminal CH_RTA. A constant voltage VRTA is applied to the corresponding sensing terminal CH_IN. Accordingly, the constant voltage VRTA is applied to the corresponding first sensing terminal CH_IN1.

For example, in the disclosure of FIG. 14, the second sensing terminal CH_IN2 is electrically connected to the sensing line SL. The switching element 715 having one end electrically connected to the sensing terminal branch node 720 of the second sensing terminal CH_IN2 is turned off (e.g., placed in the open position).

If the switching element 715 is turned off, the sensing terminal CH_IN corresponding to the corresponding switching element 715 is electrically insulated from the constant voltage supply terminal CH_RTA. The corresponding sensing terminal CH_IN can be electrically connected to a sensing line SL from the display panel, and the voltage of the sensing line SL can be applied to the corresponding sensing terminal CH_IN. The voltage applied to the sensing line SL can be a voltage reflecting the characteristic value of the subpixel SP.

Referring to FIG. 14, among the k sensing terminals CH_IN1 to CH_INk disposed in each data driving circuit 200, n ($1 \le n < k$) sensing terminals CH_IN can be electrically connected with the sensing line SL, and the remaining k−n sensing terminals CH_IN may not be electrically connected with any sensing line SL.

The first sensing terminal area 610 is an area where the sensing terminal CH_IN electrically connected to the sensing line SL among the k sensing terminals CH_IN1 to CH_INk is positioned.

The second sensing terminal area 620 is an area where k−n sensing terminals CH_IN not electrically connected to the sensing line SL among the k sensing terminals CH_IN1 to CH_INk are positioned.

The second sensing terminal area 620 can be positioned further outside than the first sensing terminal area 610. Alternatively, the first sensing terminal area 610 can be positioned outside the second sensing terminal area 620, or the first sensing terminal area 610 and the second sensing terminal area 620 can be alternately positioned.

Among the one or more switching elements 715, the switching element 715 corresponding to the sensing terminal CH_IN positioned in the first sensing terminal area 610 can be in an OFF state. Among the one or more switching elements 715, the switching element 715 corresponding to the sensing terminal CH_IN positioned in the second sensing terminal area 620 can be in an ON state.

The sampling and hold circuit 520 electrically connected to the sensing terminal CH_IN positioned in the first sensing terminal area 610 can sample the voltage reflecting the characteristic value of the subpixel SP. The corresponding sampling and hold circuit 520 can output the sampled voltage to the analog-to-digital converter 530.

The sampling and hold circuit 520 electrically connected to the sensing terminal CH_IN positioned in the second sensing terminal area 620 can sample the voltage of the sensing terminal CH_IN to which the constant voltage VRTA is applied. The corresponding sampling and hold circuit 520 can output the sampled voltage to the analog-to-digital converter 530. The constant voltage VRTA can be a voltage supplied from the constant voltage supply terminal CH_RTA.

The display device 100 according to an embodiment of the disclosure of FIG. 14 can apply the constant voltage VRTA to the sensing terminal CH_IN that is not electrically connected to any sensing line SL from the display panel.

The display device 100 according to an embodiment of the disclosure of FIG. 14 can include one or more switching elements 715, thereby providing a data driving circuit 200 that can be commonly applied to display panels 110 having different specifications and even applied to display panels of different sizes.

Figure 15:
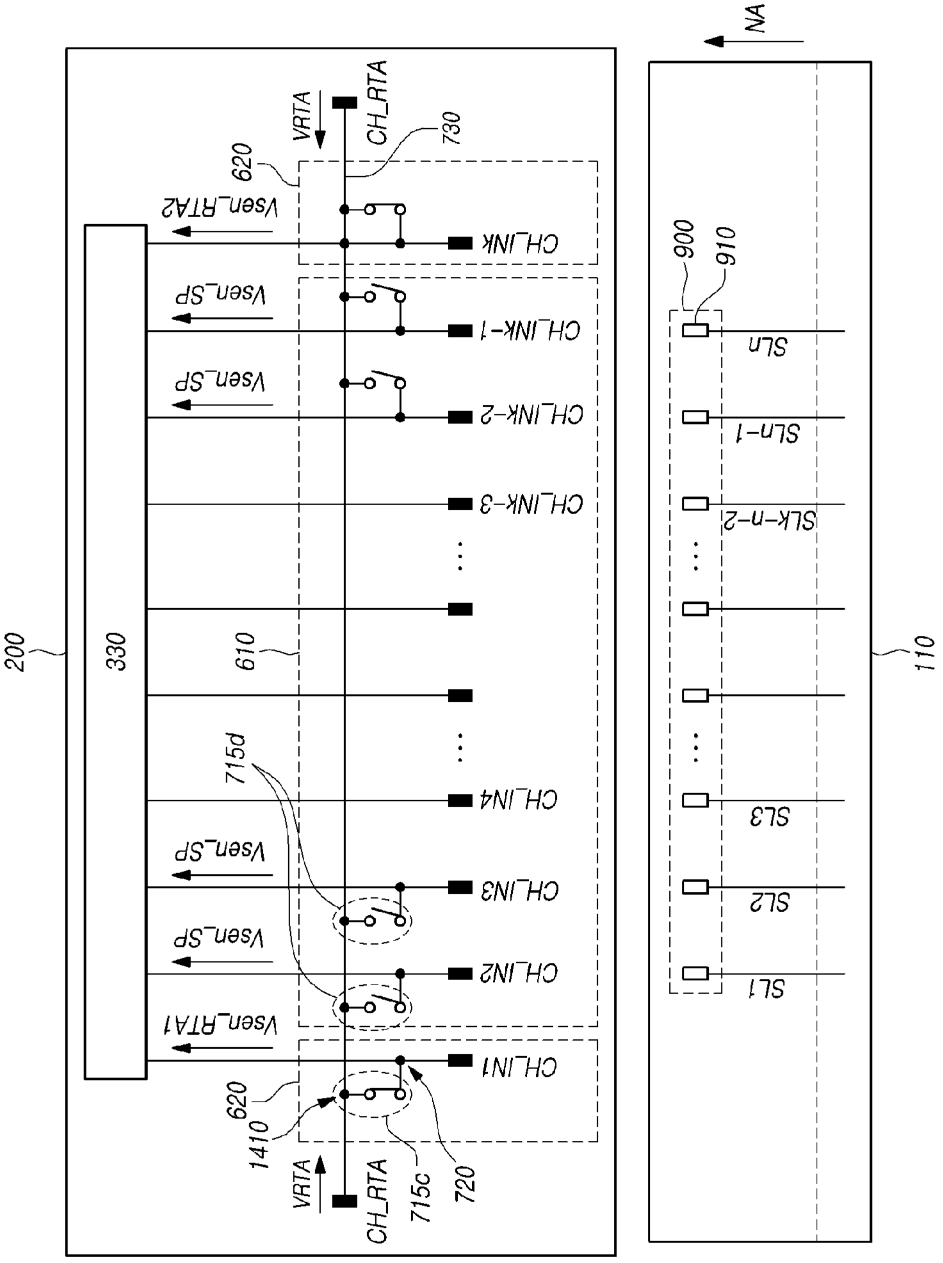
FIG. 15 is a view illustrating a data driving circuit of FIG. 14 according to an embodiment of the disclosure.

FIG. 15 is a view illustrating a data driving circuit 200 in the disclosure of FIG. 14.

Referring to FIG. 15, the constant voltage supply terminal CH_RTA disposed in the data driving circuit 200 supplies the constant voltage VRTA to the constant voltage supply line 730.

Each of one or more switching elements 715 can be disposed corresponding to one sensing terminal CH_IN. Each of the one or more switching elements 715 is turned off if the sensing terminal CH_IN corresponding to the corresponding switching element 715 is electrically connected to one of the sensing lines SL and is turned on if it is not electrically connected to any sensing line SL.

A switching element 715*c* is positioned between the first sensing terminal CH_IN1 and the constant voltage supply terminal CH_RTA. The corresponding switching element 715*c* can be the outermost switching element 715*c* among the plurality of switching elements 715.

If the first sensing terminal CH_IN1 is not electrically connected to any sensing line SL, the outermost switching element 715*c* is turned on (e.g., closed), and the constant voltage VRTA is supplied to the first sensing terminal CH_IN1. If the first sensing terminal CH_IN1 is electrically connected to one of the sensing lines SL, the outermost switching element 715*c* is turned off (e.g., opened).

Accordingly, the ON/OFF state of the outermost switching element 715*c* is determined depending on whether the first sensing terminal CH_IN1 is electrically connected to a sensing line SL. In other words, the outermost switching element 715*c* corresponds to the switching element 715*c* belonging to the first group.

Referring to FIG. 15, depending on whether the second sensing terminal CH_IN2 and the third sensing terminal CH_IN3 each are electrically connected to a sensing line SL, the ON/OFF of the inner switching element 715*d* is determined. In other words, the switching element 715*d* positioned inside corresponds to the switching element 715*d* belonging to the first group.

The one or more switching elements 715*c* and 715*d* disclosed in FIG. 15 can be switching elements 715 belonging to the above-described first group.

One end of each of one or more switching elements 715 is electrically connected to the sensing terminal CH_IN via the sensing terminal branch node 720. The other end of each of the one or more switching elements 715 is electrically connected to the constant voltage supply terminal CH_RTA via the constant voltage source branch node 1410.

Referring to FIG. 15, the first sensing terminal CH_IN1 and the kth sensing terminal CH_INk can be positioned in the second sensing terminal area 620. Among the k sensing terminals CH_IN1 to CH_INk, the remaining sensing terminals CH_IN except for the first sensing terminal CH_IN1 and the kth sensing terminal CH_INk can be positioned in the first sensing terminal area 610.

The switching element 715*c* having one end connected to the first sensing terminal CH_IN1 is turned on. A constant voltage VRTA is applied to the first sensing terminal CH_IN1 positioned in the second sensing terminal area 620.

The switching elements 715*d* each having one end connected to the second sensing terminal CH_IN2 and the third sensing terminal CH_IN3 are turned off. The second sensing terminal CH_IN2 and the third sensing terminal CH_IN3 positioned in the first sensing terminal area 610 are electrically connected to the sensing lines SL, respectively.

The sensing unit 330 can sense the first sensing terminal CH_IN1 to receive the first ADC compensation sensing voltage Vsen_RTA1. The sensing unit 330 can sense the kth sensing terminal CH_INk to receive the second ADC compensation sensing voltage Vsen_RTA2.

The sensing unit 330 can sense each of the second to k−1th sensing terminals CH_IN2 to CH_INk−1 and receive the voltage Vsen_SP reflecting the characteristic value of the subpixel SP.

Accordingly, the data driving circuit 200 according to an embodiment of the disclosure of FIG. 15 can be commonly used in display panels 110 having various specifications and different sizes.

Figure 16:
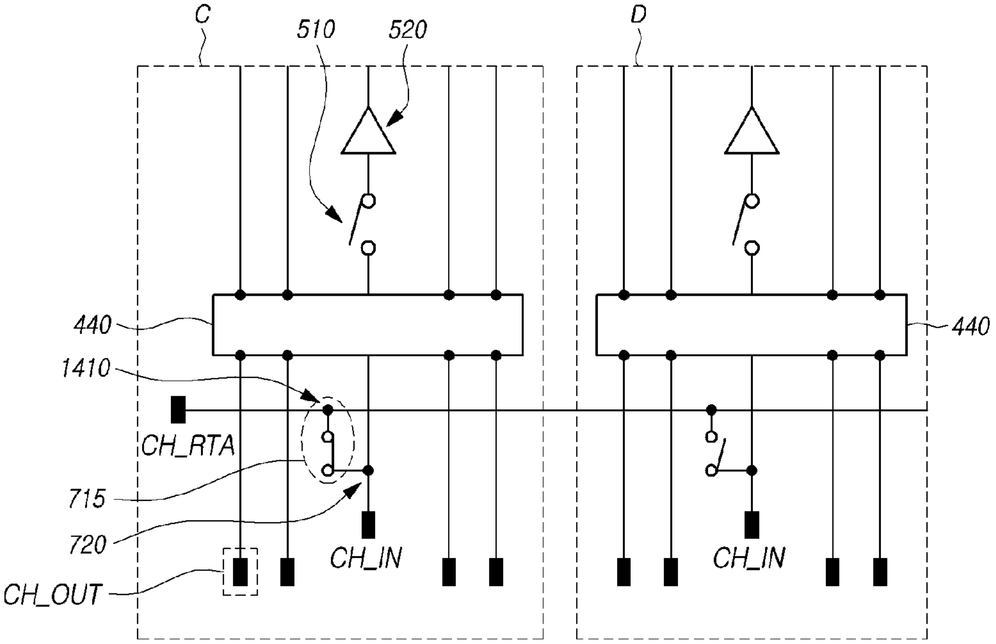
FIG. 16 is a view illustrating operations of circuit elements disposed in a first sensing terminal area and a second sensing terminal area and a voltage at a specific node of FIG. 14 according to an embodiment of the disclosure.

FIG. 16 is a view illustrating operations of circuit elements disposed in a first sensing terminal area 610 and a second sensing terminal area 620 and a voltage at a specific node in the disclosure of FIG. 14.

Referring to FIGS. 14 and 16, area C corresponds to the second sensing terminal area 620, and area D corresponds to the first sensing terminal area 610.

In area C, the sensing terminal CH_IN is not electrically connected to a sensing line SL, and the output terminal CH_OUT is not electrically connected to a data line DL. The switching element 715 corresponding to the corresponding sensing terminal CH_IN can be in an ON state. The sampling and hold circuit 520 of area C can sample the voltage of the sensing terminal branch node 720, and the voltage of the corresponding sensing terminal branch node 720 can be the ADC compensation sensing voltage Vsen_RTA.

For area D, the sensing terminal CH_IN is electrically connected to a sensing line SL, and the output terminal CH_OUT is electrically connected to a data line DL. The switching element 715 corresponding to the corresponding sensing terminal CH_IN can be in an OFF state. The sampling and hold circuit 520 of area D can sample the voltage of the sensing terminal branch node 720, and the voltage of the corresponding sensing terminal branch node can be a voltage Vsen_SP reflecting the characteristic value of the subpixel SP.

Figure 17:
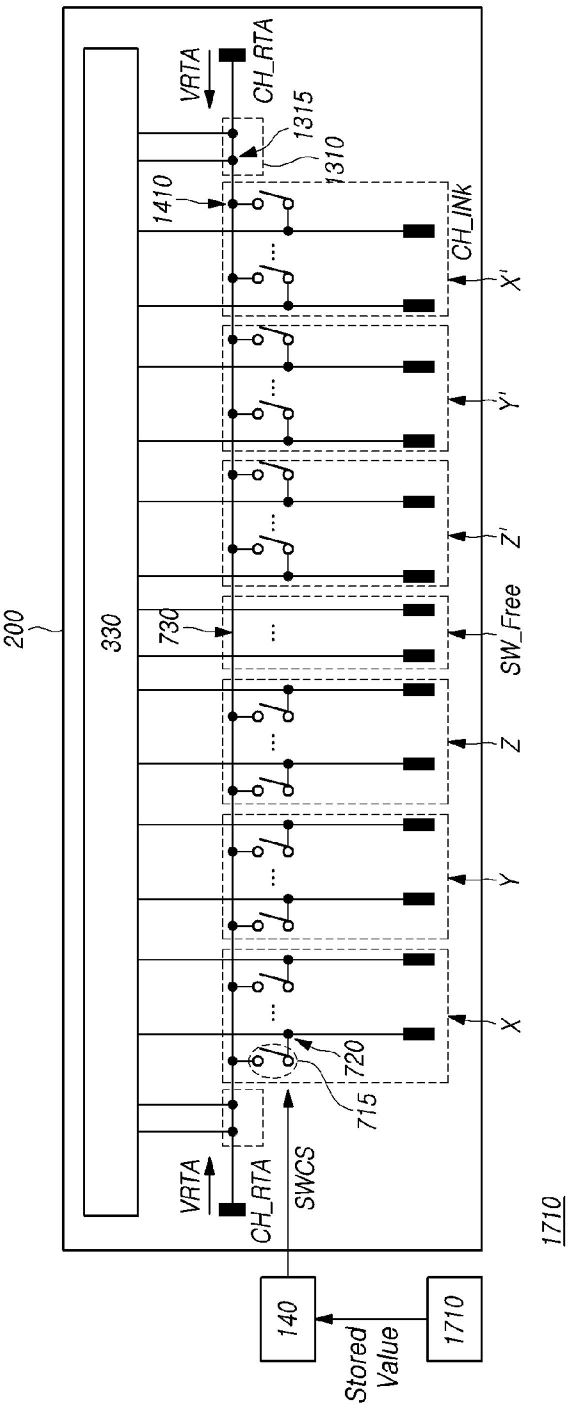
FIG. 17 is a view illustrating common use of a data driving circuit according to an embodiment of the disclosure.

FIG. 17 is a view illustrating common use of a data driving circuit 200 according to an embodiment of the disclosure.

Referring to FIG. 17, a constant voltage supply terminal CH_RTA is disposed in each of the one or more data driving circuits 200. The constant voltage supply terminal CH_RTA can be electrically connected to each other through the constant voltage supply line 730. The constant voltage supply terminal CH_RTA supplies the constant voltage VRTA to the constant voltage supply line 730.

When the dummy area 1310 is present in the data driving circuit 200, the dummy node 1315 is positioned in the dummy area 1310. One or more dummy nodes 1315 can exist in the dummy area 1310. The sensing unit 330 can further include a dummy node sampling switch 510*a* and a dummy node sampling and hold circuit 520_a_ for sampling the voltage of the dummy node 1315.

Each of the one or more dummy nodes 1315 is positioned on the constant voltage supply line 730. Each of the one or more dummy nodes 1315 can be positioned between the constant voltage supply terminal CH_RTA and the constant voltage source branch node 1410 electrically connected to the outermost switching element 715.

Accordingly, the constant voltage VRTA is applied to the dummy node 1315 regardless of the specifications of the display panel 110.

The sensing unit 330 can sense the voltage of the dummy node 1315 positioned in the dummy area 1310. The voltage of the dummy node 1315 sensed by the sensing unit 330 can be an ADC compensation sensing voltage Vsen_RTA.

The sensing unit 330 can sense the voltage of the sensing terminal CH_IN. The sensing unit 330 can sense the sensing terminal CH_IN electrically connected to the sensing line SL to receive the voltage Vsen_SP reflecting the characteristic value of the subpixel SP. The sensing unit 330 can sense the sensing terminal CH_IN that is not electrically connected to the sensing line SL to receive the ADC compensation sensing voltage Vsen_RTA.

A display device 100 according to an embodiment of the disclosure of FIG. 17 can include a display panel 110, a data driving circuit 200 supplying a data voltage to the display panel 110, a memory 1710 storing panel information (also referred to as "specification information") about the display panel 110, and a controller 140 controlling the operation of the data driving circuit 200 based on a value stored in the memory 1710.

The data driving circuit 200 can include k sensing terminals CH_IN1 to CH_INk and a constant voltage supply terminal CH_RTA.

Referring to FIG. 17, the data driving circuit 200 can include a plurality of switching elements 715. The plurality of switching elements 715 are electrically connected to sensing terminals CH_IN positioned in areas X, X', Y, Y', Z, and Z', respectively.

The memory 1710 stores the value corresponding to the panel information about the display panel 110 included in the display device 100.

The memory 1710 can be implemented as a separate storage medium from the controller 140. Alternatively, the memory 1710 can be integrated with the controller 140, and the memory 1710 can be implemented as a register in the controller 140.

The controller 140 outputs a switch control signal SWCS based on the value stored in the memory 1710 and controls one or more switching elements 715 included in the data driving circuit 200 through the switch control signal SWCS.

Referring to FIG. 17, if the size of the display panel 110 included in the display device 100 is size A, a value of 00 can be stored in the memory 1710.

When the size of the display panel 110 is size A, the controller 140 controls one or more switching elements 715 positioned in areas X, X', Y, Y', Z, and Z' to turn off.

When the size of the display panel 110 included in the display device 100 is size B, a value of 01 can be stored in the memory 1710.

When the size of the display panel 110 is size B, the controller 140 controls one or more switching elements 715 positioned in areas X and X' to turn on. The controller 140 controls one or more switching elements 715 positioned in areas Y, Y', Z, and Z' to turn off.

When the size of the display panel 110 included in the display device 100 is size C, a value of 10 can be stored in the memory 1710.

When the size of the display panel 110 is size C, the controller 140 controls one or more switching elements 715 positioned in areas X, X', Y, and Y' to turn on. The controller 140 controls one or more switching elements 715 positioned in areas Z and Z' to turn off.

When the size of the display panel 110 included in the display device 100 is size D, a value of 11 can be stored in the memory 1710.

When the size of the display panel 110 is size D, the controller 140 controls one or more switching elements 715 positioned in areas X, X', Y, Y', Z, and Z' to turn on. For example, the controller can be preprogrammed with different settings for the data driving circuit depending on the size of the display panel (e.g., size A, B, C or D).

A switch free area SW_Free can exist in the data driving circuit 200. The switching element 715 for switching the connection between the sensing terminal CH_IN and the constant voltage supply terminal CH_RTA may not be disposed in the switch free area SW_Free. The sensing terminal CH_IN positioned in the switch free area SW_Free can be electrically connected to the sensing line SL. A voltage reflecting a change in the characteristic value of the subpixel SP can be applied to the sensing terminal CH_IN of the switch-free area SW_Free.

The switch-free area SW_Free does not overlap area X, area X', area Y, area Y', area Z, and area Z'.

Accordingly, one data driving circuit 200 can be commonly used for display panels 110 having various specifications and different sizes.

If there are only four specifications for the display panel 110, the sensing terminal CH_IN positioned in the switch free area SW_Free among the k sensing terminals CH_IN1 to CH_INk is connected with a corresponding sensing line SL regardless of the specifications of the display panel 110. The switching element 715 may not be connected to the sensing terminal CH_IN connected to a sensing line SL regardless of the specifications of the display panel 110.

Figure 18:
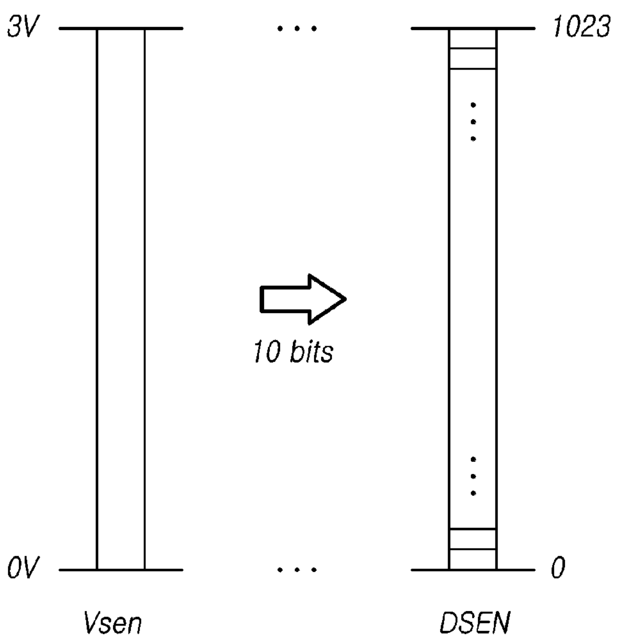
FIG. 18 is a view schematically illustrating an input/output correspondence of an analog-to-digital converter according to an embodiment of the disclosure.

FIG. 18 is a view schematically illustrating an input/output correspondence of an analog-to-digital converter 530 according to an embodiment of the disclosure.

Referring to FIG. 18, the range of the sensing voltage Vsen transferred from the display device 100 according to an embodiment of the disclosure to the analog-to-digital converter 530 included in the data driving unit 120 can be 0V to 3V, and the range of the digital sensing data DSEN output from the analog-to-digital converter 530 can be 0 to 1023 corresponding to 10 bits. In other words, in the analog-to-digital converter 530, when the sensing voltage Vsen has a range of 0V to 3V, the range of digital sensing data DSEN that can be expressed in 10 bits can correspond to 0 to 1023.

Figure 19:
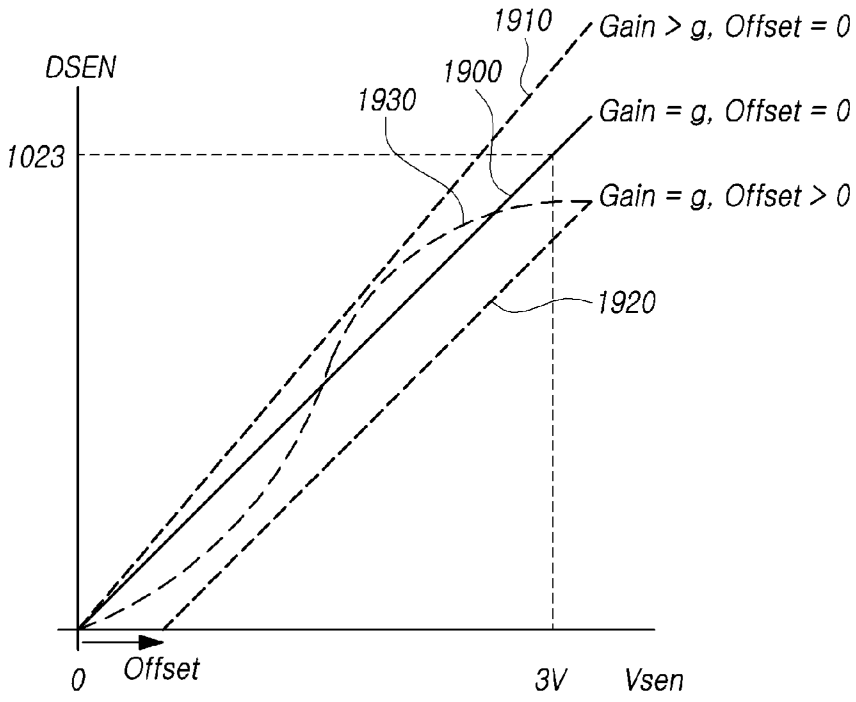
FIG. 19 is a view illustrating an example of an initial input/output function of an analog-to-digital converter and an input/output function of an analog-to-digital converter where an input/output deviation occurs according to an embodiment of the disclosure.

FIG. 19 is a view illustrating an example of an initial input/output function of an analog-to-digital converter 530 and an input/output function of an analog-to-digital converter 530 where an input/output deviation occurs according to an embodiment of the disclosure.

Referring to FIG. 19, in an ideal situation, the input/output relationship of the analog-to-digital converter 530 can be defined according to the straight line 1900 connecting the point (0,0) where the sensing voltage Vsen is 0V, and the digital sensing data DSEN is 0 and the point (3,1023) where the sensing voltage Vsen is 3V, and the digital sensing data DSEN is 1023.

The ideal analog-to-digital converter 530 can have a linear slope in which a gain corresponding to the slope is g (=1023/3) and an offset corresponding to the x-axis intercept is 0.

However, even when the analog-to-digital converter 530 has a linear characteristic, in reality, it can also have a characteristic of being expressed as a straight line 1910 in which the gain corresponding to the slope is larger than g or a linear characteristic of being expressed as a straight line in which the gain corresponding to the slope is smaller than g.

Further, the analog-to-digital converter 530 can also have a linear characteristic of being expressed as a straight line 1920 in which an offset corresponding to the x-axis intercept is larger than zero.

As a result, the analog-to-digital converter 530 can have a non-linear characteristic 1930 rather than a linear characteristic depending on the relationship between the sensing voltage Vsen and the digital sensing data DSEN.

The phenomenon in which the gain of the analog-to-digital converter 530 differs from the ideal gain (Gain=g) or the offset differs from the ideal offset (Offset=0) can be caused by internal factors, or external factors, such as a change in temperature.

For example, the characteristic value of the analog-to-digital converter 530 can be varied due to long-term operation of the analog-to-digital converter 530 or the data driving circuit 200 including the same or the display device 100 or external factors, such as an increase in temperature or application of a high pressure.

To minimize the deviation of the characteristic value (gain or offset) of the analog-to-digital converter 530, the analog-to-digital converter 530 can receive the ADC compensation sensing voltage Vsen_RTA through the sensing terminal CH_IN positioned in the second sensing terminal area 620 or the dummy node 1315.

The ADC compensation sensing voltage Vsen_RTA is not affected by the change in the characteristic value of the subpixel SP. Accordingly, it is possible to minimize the fluctuation of the level of the voltage applied to compensate for the input/output characteristic value of the analog-to-digital converter 530 due to an external factor.

Figure 20:
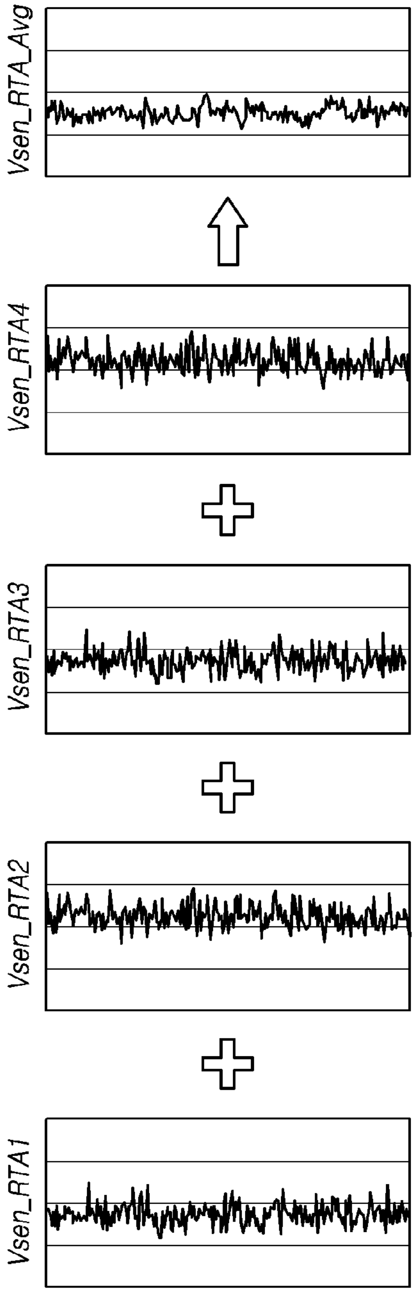
FIG. 20 is a view illustrating an example of performing ADC input/output compensation by averaging two or more ADC compensation sensing voltages according to an embodiment of the disclosure.

FIG. 20 is a view illustrating an example of performing ADC input/output compensation by averaging two or more ADC compensation sensing voltages Vsen_RTA.

Referring to FIG. 20, the analog-to-digital converter 530 can sense the sensing terminal CH_IN positioned in the dummy node 1315 or the second sensing terminal area 620 and receive two or more ADC compensation sensing voltages Vsen_RTA.

For example, the first ADC compensation sensing voltage Vsen_RTA1 and the fourth ADC compensation sensing voltage Vsen_RTA4 can be the sensed voltages of the dummy node 1315. The second ADC compensation sensing voltage Vsen_RTA2 and the third ADC compensation sensing voltage Vsen_RTA3 can be the sensed voltages of the sensing terminal CH_IN positioned in the second sensing terminal area 620.

Referring to FIG. 20, the two or more sensed ADC compensation sensing voltages Vsen_RTA can have different values depending on detection times due to external factors at the time when the sampling switch 510 connected with the sensing terminal CH_IN positioned in the dummy node 1315 or second sensing terminal area 620 is turned on or internal factors in the display device 100.

Although the two or more sensed ADC compensation sensing voltages Vsen_RTA have different values, since the voltages all are values detected from the same constant voltage VRTA, the error due to the sensing position and sensing time can be reduced by summating and averaging all of the two or more sensed ADC compensation sensing voltages Vsen_RTA.

Accordingly, it is possible to reduce errors by compensating for the characteristic value of the analog-to-digital converter 530 with the value Vsen_RTA_Avg obtained by receiving, summating and averaging two or more ADC compensation sensing voltages Vsen_RTA, as compared with compensating for the characteristic value of the analog-to-digital converter 530 only using any one value among the first to fourth ADC compensation sensing voltages Vsen_RTA1, Vsen_RTA2, Vsen_RTA3, and Vsen_RTA4.

Figure 21:
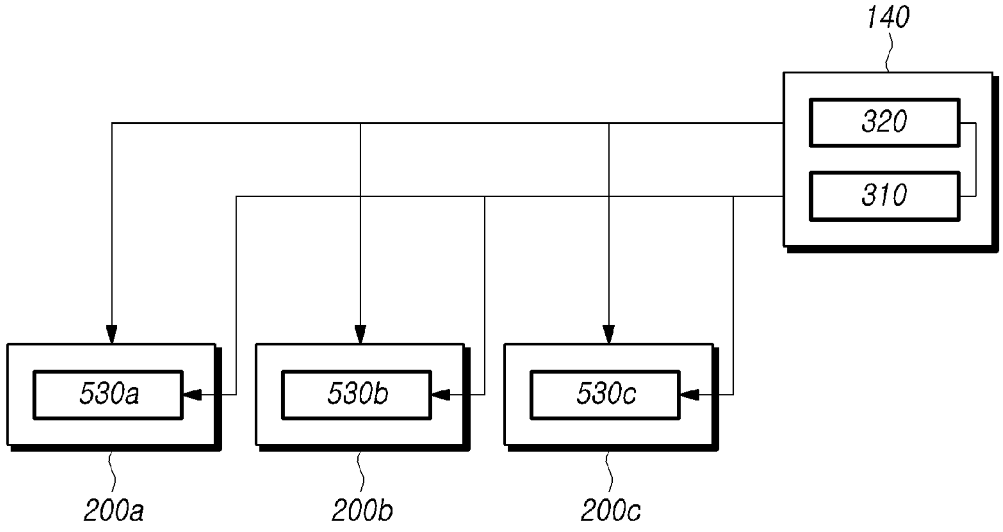
FIG. 21 is a view schematically illustrating a compensation process of a display device 100 according to an embodiment of the disclosure.

FIG. 21 is a view schematically illustrating a compensation process of a display device 100 according to an embodiment of the disclosure.

Referring to FIG. 21, a display device 100 according to an embodiment of the disclosure can include one or more data driving circuits 200*a*, 200*b*, and 200*c*.

The data driving circuits 200*a*, 200*b*, and 200*c* can include at least one analog-to-digital converters 530*a*, 530*b*, and 530*c*, respectively.

To compensate for at least one of characteristic value deviations between the sensing terminals CH_IN connected with the analog-to-digital converters 530*a*, 530*b*, and 530*c* and characteristic value deviations between the analog-to-digital converters 530*a*, 530*b*, and 530*c* when the characteristic values of the analog-to-digital converters 530*a*, 530*b*, and 530*c* are varied, the compensation circuit 320 of the controller 140 in the display device 100 according to an embodiment of the disclosure compensates for the characteristic values of the analog-to-digital converters 530*a*, 530*b*, and 530*c* by updating a lookup table LUT stored in the storage unit 310.

In other words, upon determining that the characteristic values of the analog-to-digital converters 530*a*, 530*b*, and 530*c* are varied through the ADC compensation sensing voltage Vsen_RTA, the compensation circuit 320 can perform an "analog-to-digital converter characteristic value compensation process" of updating the characteristic values (e.g., offset or gain) of the analog-to-digital converters 530*a*, 530*b*, and 530*c* per sensing terminal CH_IN included in the lookup table in the storage unit 310 to compensate for the changes in the characteristic values of the analog-to-digital converters 530*a*, 530*b*, and 530*c*.

The compensation circuit 320 can further perform the "subpixel characteristic value compensation process" as described above.

Figure 22:
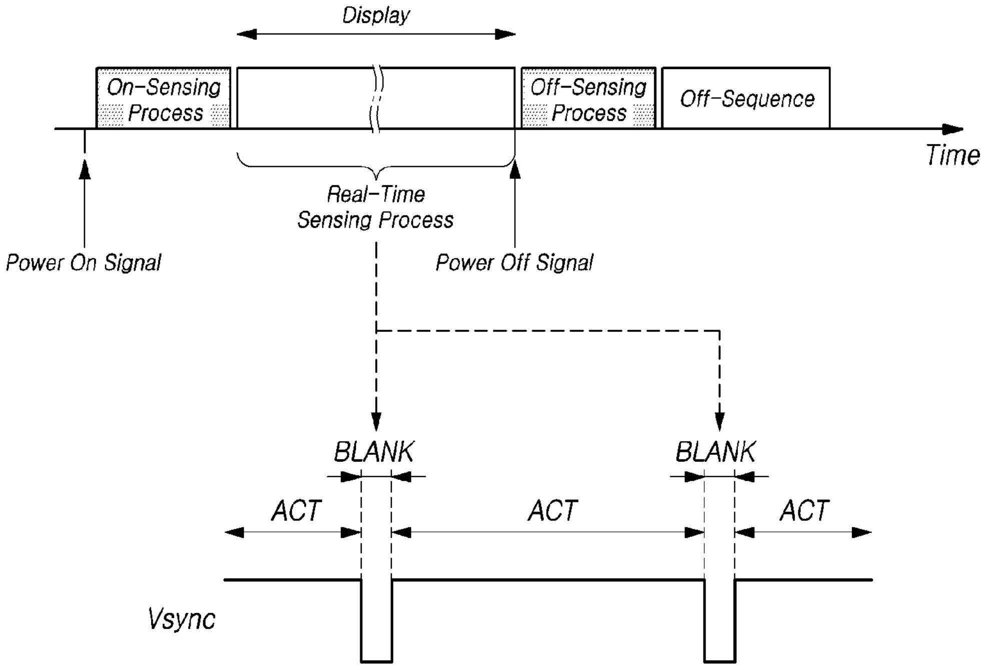
FIG. 22 is a view illustrating a driving timing of a display device according to an embodiment of the disclosure.

FIG. 22 is a view illustrating a driving timing of a display device according to an embodiment of the disclosure.

Referring to FIG. 22, when a power on signal is generated, the display device 100 of the disclosure can perform any one of the above-described compensation processes. Such sensing process is referred to as an "on-sensing process."

Referring to FIG. 22, when a power off signal is generated, the display device 100 of the disclosure can perform any one of the above-described compensation processes before an off-sequence, e.g., power-off, proceeds. Such sensing process is referred to as an "off-sensing process."

Referring to FIG. 22, the display device 100 according to an embodiment of the disclosure can perform any one of the above-described compensation processes during display driving after the power-on signal is generated and until the power-off signal is generated. Such sensing process is referred to as a "real-time sensing process."

Such real-time sensing process can be performed every blank period BLANK between the active times ACT with respect to the vertical sync signal Vsync or at blank periods spaced apart by a predetermined interval (e.g., updating after every 10 frames or 100 frames, etc.).

After the "analog-to-digital converter characteristic value compensation process" is performed during display driving after the power-on signal is generated and until before the power-off signal is generated, the "analog-to-digital converter characteristic value compensation process" can be performed during a blank period BLANK different from the "subpixel characteristic value compensation process."

The controller 140 can perform the "subpixel characteristic value compensation process" in some blank periods BLANK among several blank periods BLANK and perform the "analog-to-digital converter characteristic value compensation process" in other blank periods BLANK.

Specifically, the controller 140 can perform the "analog-to-digital converter characteristic value compensation process" by driving only some sampling switches 510 among the plurality of sampling switches 510 during at least one blank period among a plurality of blank periods on the vertical synchronization signal Vsync.

Here, the "some sampling switches 510" can mean sampling switches 510 not connected with a sensing line SL among the plurality of sampling switches and the dummy node sampling switch 510*a*.

Accordingly, the data driving circuit 200 can be commonly applied to display panels 110 having various specifications and different sizes.

Thus, it is possible to compensate for the change in the characteristic value of the analog-to-digital converter 530 in real-time. The above-described process of compensating for a change in the characteristic value of the analog-to-digital converter 530 in real-time is also referred to as a "real-time ADC offset compensation (RTAOC) process."

Accordingly, it is possible to more precisely compensate for the change in the characteristic value of the subpixel SP and enhance the display quality of the display device 100.

The foregoing embodiments of the present disclosure are briefly described below.

According to embodiments of the disclosure, there can be provided a display device 100 comprising a data driving circuit 200 including k (k≥2) sensing terminals CH_IN1 to CH_INk and a switching unit 710 including a switching element 715 positioned between an outermost sensing terminal CH_IN among the k sensing terminals CH_IN1 to CH_INk and a constant voltage supply terminal CH_RTA and a display panel 110 having, thereon, a plurality of subpixels SP and a plurality of sensing lines SL electrically connected with the plurality of subpixels SP, in which the plurality of sensing lines SL are electrically connected with n (1≤n≤k) sensing terminals CH_IN among the k sensing terminals CH_IN1 to CH_INk disposed in the data driving circuit 200.

According to embodiments of the disclosure, there can be provided the display device 100, in which the switching unit 710 includes m (m≥1) switching elements disposed corresponding to m sensing terminals among the k sensing terminals, and in which k is m+n or less.

According to embodiments of the disclosure, there can be provided the display device 100, in which the k sensing terminals CH_IN1 to CH_INk are positioned in either a first sensing terminal area 610 or a second sensing terminal area 620, in which the first sensing terminal area 610 is an area where a plurality of sensing terminals CH_IN electrically connected with the plurality of sensing lines SL among the k sensing terminals CH_IN1 to CH_INk are positioned in the data driving circuit 200, and in which the second sensing terminal area 620 is an area where rest except for the plurality of sensing terminals connected with the plurality of sensing lines SL among the k sensing terminals CH_IN1 to CH_INk are positioned in the data driving circuit 200.

According to embodiments of the disclosure, there can be provided the display device 100, in which the data driving circuit 200 includes a sensing unit 330, in which the sensing unit 330 includes at least one analog-to-digital converter 530, a plurality of sampling and hold circuits 520 outputting an analog voltage to the analog-to-digital converter 530 and a plurality of sampling switches 510 each including a first end electrically connected with each of the plurality of sampling and hold circuits 520 and a second end electrically connected with each of the k sensing terminals.

According to embodiments of the disclosure, there can be provided the display device 100, in which the data driving circuit 200 further includes a constant voltage supply line 730 through which a constant voltage is supplied from the constant voltage supply terminal CH_RTA, in which a dummy node 1315 is present on the constant voltage supply line 730, and in which the sensing unit 330 further includes a dummy node sampling and hold circuit 520*a* sampling a voltage of the dummy node 1315 and a dummy node sampling switch 510*a* having a first end electrically connected with the dummy node sampling and hold circuit 520*a* and a second end electrically connected with the dummy node.

According to embodiments of the disclosure, there can be provided the display device 100, in which an outermost switching element 715 among the m switching elements 715 has a first end electrically connected with the outermost sensing terminal CH_IN among the k sensing terminals CH_IN1 to CH_INk and a second end electrically connected with the constant voltage supply terminal CH_RTA.

According to embodiments of the disclosure, there can be provided the display device 100, in which the m switching elements 715 are one or more switching elements 715 belonging to a first group, and in which the one or more switching elements 715 belonging to the first group are turned off if a sensing terminal CH_RTA corresponding to a corresponding switching element 715 is electrically connected with the sensing line SL and are turned on if the sensing terminal CH_IN corresponding to the corresponding switching element 715 is not connected with a sensing line SL.

According to embodiments of the disclosure, there can be provided the display device 100, in which the switching unit 710 further includes one or more switching elements 715*b* belonging to a second group, and in which the one or more switching elements 715*b* belonging to the second group are turned on if all of the one or more switching elements 715 belonging to the first group are turned on.

According to embodiments of the disclosure, there can be provided the display device 100, in which the m switching elements 715 each have a first end electrically connected with each of the m sensing terminals 715 via a sensing terminal branch node 720 and a second end electrically connected with the constant voltage supply line 730 via a constant voltage source branch node 1410.

According to embodiments of the disclosure, there can be provided the display device 100 further comprising a controller 140 driving the data driving circuit 200, and in which the controller 140 controls all of the m switching elements 715 to turn off if all of the m sensing terminals CH_IN are connected with the plurality of sensing lines SL and controls the switching element 715 having an end connected to a sensing terminal branch node 720 of a sensing terminal CH_IN not connected with a sensing line among the m sensing terminals to turn on if at least one sensing terminal CH_IN among the m sensing terminals is not connected with a sensing line.

According to embodiments of the disclosure, there can be provided the display device 100 further comprising a memory 1710 storing panel information about the display panel, in which the controller 140 controls the two or more switching elements 715 based on a value stored in the memory 1710, and in which the panel information about the display panel 110 is information about which sensing terminal CH_IN among the k sensing terminals CH_IN1 to CH_INk disposed in each of the one or more data driving circuits 200 is connected with a sensing line SL.

According to embodiments of the disclosure, there can be provided the display device 100, in which the controller 140 performs an analog-to-digital converter characteristic value compensation process by driving only some sampling switches 510 among the plurality of sampling switches 510 during at least one blank period BLANK among a plurality of blank periods BLANK on a vertical synchronization signal Vsync, and in which the some sampling switches 510 are sampling switches 510 not electrically connected with a sensing line SL among the plurality of sampling switches 510.

According to embodiments of the disclosure, there can be provided a data driving circuit 200 comprising k ($k \geq 2$) sensing terminals CH_IN1 to CH_INK, a constant voltage supply terminal CH_RTA supplying a constant voltage VRTA to a constant voltage supply line 730, a sensing unit 330 receiving an analog voltage from each of the k sensing terminals CH_IN1 to CH_INk, and a switching unit 710 including a switching element 715 positioned between an outermost sensing terminal CH_IN among the k sensing terminals CH_IN1 to CH_INk and the constant voltage supply line 730.

According to embodiments of the disclosure, there can be provided the data driving circuit 200, in which the sensing unit 330 further includes at least one analog-to-digital converter 530, a plurality of sampling and hold circuits 520 outputting an analog voltage to the analog-to-digital converter 530 and a plurality of sampling switches 510 each including a first end electrically connected with each of the plurality of sampling and hold circuits 520 and a second end electrically connected with each of the k sensing terminals CH_IN1 to CH_INk.

According to embodiments of the disclosure, there can be provided the data driving circuit 200, in which the switching unit 710 includes two or more switching elements 715, and in which the two or more switching elements 715 are connected in series with each other.

According to embodiments of the disclosure, there can be provided the data driving circuit 200, in which the switching element 715 has a first end electrically connected to a sensing terminal branch node 720 of the outermost sensing terminal CH_IN and a second end electrically connected to a constant voltage source branch node 1410 of the constant voltage supply line 730.

According to embodiments of the disclosure, there can be provided the data driving circuit 200, in which all of the one or more switching elements 715 turn off if k sensing terminals CH_IN1 to CH_INk among the k sensing terminals CH_IN1 to CH_INk are electrically connected with a sensing line SL of a display panel 110, and in which if n ($1 \leq n < k$) sensing terminals CH_IN among the k sensing terminals CH_IN1 to CH_INk are electrically connected with the sensing line SL of the display panel 110, a switching element 715 corresponding to the n sensing terminals CH_IN turns off, and a switching element 715 corresponding to remaining k−n sensing terminals CH_IN turns on.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device, comprising:

a data driving circuit including k sensing terminals and a switching part including a switching element positioned between an outermost sensing terminal among the k sensing terminals and a constant voltage supply terminal, wherein k is a positive integer greater than or equal to 2; and a display panel including a plurality of subpixels and a plurality of sensing lines electrically connected with the plurality of subpixels, wherein the plurality of sensing lines are electrically connected with n sensing terminals among the k sensing terminals disposed in the data driving circuit, where n is a positive integer less than or equal to k and n is greater than or equal to 1, wherein the switching part is turned on to supply a constant voltage to at least one of the k sensing terminals from the constant voltage supply terminal, wherein the at least one of the k sensing terminals is not electrically connected to the plurality of sensing lines, wherein all of the one or more switching elements are configured to turn off when k sensing terminals among the k sensing terminals are electrically connected with one of the plurality of sensing lines of the display panel, and wherein when the n sensing terminals among the k sensing terminals are electrically connected with the plurality of sensing lines of the display panel, a switching element corresponding to the n sensing terminals is turned off, and a switching element corresponding to remaining k−n sensing terminals is turned on, where n is a positive integer less than or equal to k and n is greater than or equal to 1.

2. The display device of claim 1, wherein the switching part includes m switching elements disposed corresponding to m sensing terminals among the k sensing terminals, where m is a positive integer greater than or equal to 1, and wherein k is less than or equal to m+n.

3. The display device of claim 2, wherein an outermost switching element among the m switching elements has a first end electrically connected with the outermost sensing terminal among the k sensing terminals and a second end electrically connected with the constant voltage supply terminal.

4. The display device of claim 3, wherein the m switching elements are one or more switching elements belonging to a first switching group, and wherein the one or more switching elements belonging to the first switching group are configured to be turned off when a sensing terminal corresponding to a corresponding switching element is electrically connected with one of the plurality of sensing lines and turned on when the sensing terminal corresponding to the corresponding switching element is not connected with any of the plurality of sensing lines.

5. The display device of claim 4, further comprising a controller configured to drive the data driving circuit, wherein the controller is further configured to control all of the m switching elements to turn off when all of the m sensing terminals are connected with one of the plurality of sensing lines, and control a switching element having an end connected to a sensing terminal branch node of a sensing terminal not connected with any sensing line among the m sensing terminals to turn on when at least one sensing terminal among the m sensing terminals is not connected with any of the plurality of sensing lines.

6. The display device of claim 5, further comprising a memory storing panel information about the display panel, wherein the controller is further configured to control two or more of the m switching elements based on a value stored in the memory, and wherein the panel information includes information about which sensing terminal among the k sensing terminals disposed in each of the one or more data driving circuits is connected with a sensing line among the plurality of sensing lines.

7. The display device of claim 5, wherein the controller is further configured to perform an analog-to-digital converter characteristic value compensation process by driving only some sampling switches among the plurality of sampling switches during at least one blank period among a plurality of blank periods based on a vertical synchronization signal, and wherein the some sampling switches are sampling switches not electrically connected with any of the plurality of sensing lines.

8. The display device of claim 4, wherein the switching part further includes one or more switching elements belonging to a second switching group, and wherein the one or more switching elements belonging to the second switching group are configured to turn on when all of the one or more switching elements belonging to the first switching group are turned on.

9. The display device of claim 4, wherein the data driving circuit further includes a constant voltage supply line configured to supply the constant voltage from the constant voltage supply terminal, and wherein the m switching elements each have a first end electrically connected with one of the m sensing terminals via a sensing terminal branch node and a second end electrically connected with the constant voltage supply line via a constant voltage source branch node.

10. The display device of claim 2, wherein the data driving circuit includes a sensing part, wherein the sensing part includes:

at least one analog-to-digital converter;

a plurality of sampling and hold circuits configured to output an analog voltage to the at least one analog-to-digital converter; and a plurality of sampling switches each including a first end electrically connected with one of the plurality of sampling and hold circuits and a second end electrically connected with one of the k sensing terminals.

11. The display device of claim 10, wherein the data driving circuit further includes a constant voltage supply line configured to supply the constant voltage from the constant voltage supply terminal, wherein a dummy node is present on the constant voltage supply line, and wherein the sensing part further includes:

a dummy node sampling and hold circuit configured to sample a voltage of the dummy node; and a dummy node sampling switch having a first end electrically connected with the dummy node sampling and hold circuit and a second end electrically connected with the dummy node.

12. The display device of claim 1, wherein a first group of sensing terminals among the k sensing terminals are positioned in a first sensing terminal area and a second group of sensing terminals among the k sensing terminals are positioned in a second sensing terminal area, wherein the first sensing terminal area is an area where a plurality of sensing terminals electrically connected with the plurality of sensing lines among the k sensing terminals are positioned in the data driving circuit, and wherein the second sensing terminal area is an area where remaining sensing terminals are positioned in the data driving circuit, the remaining sensing terminals being different than the plurality of sensing terminals connected with the plurality of sensing lines among the k sensing terminals, and the remaining sensing terminals are not connected to any of the plurality of sensing lines in the display panel.

13. The display device of claim 1, wherein the data driving circuit further includes a constant voltage supply line configured to supply the constant voltage to the at least one of the k sensing terminals via the switching part, and wherein the data driving circuit is configured to supply the constant voltage to opposite ends of the constant voltage supply line.

14. The display device of claim 1, wherein the switching part include an even number of switching elements, and wherein a first half of the even number of switching elements are disposed to correspond to a first outer side of the data driving circuit, and a second half of the even number of switching elements are disposed to correspond to a second outer side of the data driving circuit.

15. The display device of claim 1, wherein the data driving circuit further includes a constant voltage supply line configured to supply the constant voltage to the at least one of the k sensing terminals via the switching part, wherein outermost sensing terminals among the k sensing terminals are connected to the constant voltage supply line, and each of the outermost sensing terminals is not connected to any the plurality of sensing lines, and wherein a group of innermost sensing terminals among the k sensing terminals are electrically isolated from the constant voltage supply line, and each sensing terminal among the group of innermost sensing terminals is connected to a corresponding sensing line among the plurality of sensing lines.

16. A data driving circuit, comprising:

k sensing terminals, wherein k is a positive integer greater than or equal to 2;

a constant voltage supply terminal configured to supply a constant voltage to a constant voltage supply line;

a sensing part configured to receive an analog voltage from each of the k sensing terminals; and a switching part including a switching element positioned between an outermost sensing terminal among the k sensing terminals and the constant voltage supply line, wherein the switching part is turned on to supply the constant voltage to at least one of the k sensing terminals from the constant voltage supply terminal, and wherein the outermost sensing terminal and the constant voltage supply terminal are directly connected through the switching element, wherein all of the one or more switching elements are configured to turn off when k sensing terminals among the k sensing terminals are electrically connected with one of a plurality of sensing lines of a display panel, and wherein when n sensing terminals among the k sensing terminals are electrically connected with the plurality of sensing lines of the display panel, a switching element corresponding to the n sensing terminals is turned off, and a switching element corresponding to remaining k−n sensing terminals is turned on, where n is a positive integer less than or equal to k and n is greater than or equal to 1.

17. The data driving circuit of claim 16, wherein the sensing part includes:

at least one analog-to-digital converter;

a plurality of sampling and hold circuits configured to output an analog voltage to the at least one analog-to-digital converter; and a plurality of sampling switches each having a first end electrically connected to one of the plurality of sampling and hold circuits and a second end electrically connected to one of the k sensing terminals.

18. The data driving circuit of claim 17, wherein the switching part includes two or more switching elements, and wherein the two or more switching elements are connected in series with each other.

19. The data driving circuit of claim 17, wherein the switching element has a first end electrically connected to a sensing terminal branch node of the outermost sensing terminal and a second end electrically connected to a constant voltage source branch node of the constant voltage supply line.

* * * * *